(12) United States Patent
Behr

(10) Patent No.: US 10,763,657 B2
(45) Date of Patent: Sep. 1, 2020

(54) LIGHTNING PROTECTION SYSTEMS AND METHODS

(71) Applicant: LBA Group, Inc., Greenville, NC (US)

(72) Inventor: Lawrence Behr, Greenville, NC (US)

(73) Assignee: LBA Group, Inc., Greenville, NC (US)

( * ) Notice: Subject to any disclaimer, the term of this patent is extended or adjusted under 35 U.S.C. 154(b) by 847 days.

(21) Appl. No.: 15/436,114

(22) Filed: Feb. 17, 2017

(65) Prior Publication Data

US 2017/0244234 A1  Aug. 24, 2017

Related U.S. Application Data

(60) Provisional application No. 62/297,361, filed on Feb. 19, 2016, provisional application No. 62/297,533, filed on Feb. 19, 2016.

(51) Int. Cl.
*H02B 13/00* (2006.01)
*H02G 13/00* (2006.01)
(Continued)

(52) U.S. Cl.
CPC ............. *H02G 13/80* (2013.01); *E04H 12/08* (2013.01); *E04H 12/187* (2013.01); *E04H 12/20* (2013.01);
(Continued)

(58) Field of Classification Search
CPC ........ H02G 13/80; H02G 13/00; H02G 13/40; H02G 13/20; E04H 12/08; E04H 12/187; E04H 12/20; E04H 12/2238; E04H 12/345
(Continued)

(56) References Cited

U.S. PATENT DOCUMENTS

| | | |
|---|---|---|
| 433,459 A | 8/1890 | Ferrell |
| 2,186,300 A | 1/1940 | Lamar |

(Continued)

FOREIGN PATENT DOCUMENTS

| | | |
|---|---|---|
| CN | 203503977 U | 3/2014 |
| CN | 204304221 U | 4/2015 |

(Continued)

OTHER PUBLICATIONS

PCT International Search Report and Written Opinion dated Jun. 11, 2018 for International Patent Application No. PCT/US18/24331.
(Continued)

*Primary Examiner* — Angel R Estrada
(74) *Attorney, Agent, or Firm* — Ward and Smith, P.A.; Ryan K. Simmons

(57) ABSTRACT

A portable lightning protection system including a multi-section conductive mast assembly including at least a base mast section and a top mast section; an air terminal attachable to the top mast section; and a base assembly attachable to the base mast section via a hinge assembly, wherein the hinge assembly may be configured to allow the base mast section to hinge relative to the base assembly. A catenary lightning protection system including at least two lightning protection systems, each lightning protection system may include a multi-section conductive mast assembly including at least a base mast section and a top mast section; an air terminal attachable to the top mast section; a base assembly attachable to the base mast section; and may further include a catenary wire connected between the at least two lightning protection systems.

15 Claims, 34 Drawing Sheets

(51) Int. Cl.
*E04H 12/20* (2006.01)
*E04H 12/08* (2006.01)
*E04H 12/18* (2006.01)
*E04H 12/22* (2006.01)
*E04H 12/34* (2006.01)

(52) U.S. Cl.
CPC ....... *E04H 12/2238* (2013.01); *E04H 12/345* (2013.01); *H02G 13/00* (2013.01)

(58) Field of Classification Search
USPC ........ 174/2, 1, 3, 5 R, 5 SB, 5 SG; 361/117, 361/212
See application file for complete search history.

(56) References Cited

U.S. PATENT DOCUMENTS

| | | |
|---|---|---|
| 4,447,847 A | 5/1984 | Drulard |
| 5,159,521 A | 10/1992 | Guangrun et al. |
| 6,369,317 B1 | 4/2002 | Rapp |
| 6,692,142 B1 | 2/2004 | Gordin et al. |
| 6,875,915 B1 * | 4/2005 | Chung ................... H02G 13/00 174/2 |
| 6,930,239 B1 * | 8/2005 | Chen ....................... H01R 4/66 174/3 |
| 6,943,285 B2 * | 9/2005 | Chung ................... H02G 13/00 174/3 |
| 7,789,574 B2 | 9/2010 | Broberg |
| 7,960,647 B2 * | 6/2011 | Rizk ...................... H02G 13/80 174/2 |
| 8,373,065 B2 * | 2/2013 | Azuma ................... H02G 13/00 174/2 |
| 9,083,172 B2 | 7/2015 | Behr |
| 2011/0006174 A1 | 1/2011 | Hollinger |
| 2017/0244234 A1 | 8/2017 | Behr |

FOREIGN PATENT DOCUMENTS

| | | |
|---|---|---|
| DE | 202008001258 U1 | 3/2008 |
| EP | 2099109 A1 | 3/2009 |
| JP | 200077199 A | 3/2000 |
| KR | 100539704 B1 | 12/2005 |
| WO | 2016000992 A1 | 1/2016 |

OTHER PUBLICATIONS

PCT International Preliminary Report on Patentability dated Aug. 21, 2018 for International Patent Application No. PCT/US17/18378.
PCT International Search Report and Written Opinion dated May 11, 2017 for International Patent Application No. PCT/US2017/018378.

* cited by examiner

LIGHTNING PROTECTION SYSTEMS AND METHODS

RELATED APPLICATIONS

This application is related to and claims priority to U.S. Provisional Patent Application Nos. 62/297,361, entitled "Modular Lightning Protection System and Method of Deploying Same," filed on Feb. 19, 2016; and 62/297,533, entitled "Lightning Protection System with Catenary and Method of Deploying Same," filed on Feb. 19, 2016; the entire disclosures of which are incorporated herein by reference.

TECHNICAL FIELD

The presently disclosed subject matter relates generally to systems and methods for providing lightning protection, and more particularly to portable lightning protection systems and methods of deploying same.

BACKGROUND

Lightning terminals or "lightning rods" are commonly attached to numerous structures such as buildings, cell towers, drilling rigs, and tanks. Generally, these terminals are attached to the highest part of the structure and grounded. Lightning will strike the terminal instead of the structure and follows the least path of resistance to the ground. However, many portable and high value assets are not protected from lightning strikes. Such assets include, for example, portable buildings, airfields, aircraft, ground vehicles, pumping stations, fuel depots, emergency and military command posts, solar cell installations, satellite dish installations, environmental monitoring facilities, etc. Thus, there is a need for a lightning protection system that can be quickly and easily installed adjacent to such assets to provide protection from lightning strikes.

SUMMARY

In one embodiment, the disclosed subject matter provides a lightning protection system. The lightning protection system may include a multi-section conductive mast assembly including at least a base mast section and a top mast section; an air terminal attachable to the top mast section; and a base assembly attachable to the base mast section via a hinge assembly, wherein the hinge assembly is configured to allow the base mast section to hinge relative to the base assembly. The base assembly may include a plurality of radially extending inner horizontal beams having inner ends attachable to the hinge assembly and a plurality of inclined beams having inner ends attachable to the base mast section and outer ends attachable to the radially extending horizontal beams. The base assembly may further include a plurality of outer horizontal beams attachable to outer ends of the radially extending inner horizontal beams. The lightning protection system may further include at least one grounding cable to ground the multi-section conductive mast assembly. The system may further include at least one ground rod to ground the at least one grounding cable to earth. The hinge assembly may include a top horizontal plate and a bottom horizontal plate hingedly connected on at least one side thereof. The top horizontal plate and bottom horizontal plate may be hingedly connected on two opposing sides thereof. The base mast section may include a plurality of radially extending, axially aligned ribs. The inner ends of the plurality of inclined beams may be attachable to the base mast section ribs. A top horizontal plate of the hinge assembly may include an upper surface and attachment plates extending upward from the top horizontal plate upper surface for attachment to the base mast section ribs. The system may further include at least one intermediate mast section disposed between the base mast section and the top mast section. The top horizontal plate and bottom horizontal plate may be secured together in a non-hinged state via one or more cam lever fasteners, wherein one of the top horizontal plate and bottom horizontal plate comprises a captive cam lever fastener and the other of the top horizontal plate and bottom horizontal plate comprises a corresponding slot for the cam lever fastener to engage. Sections of the multi-section conductive mast may be joined by a threaded coupling. The inner ends of the plurality of radially extending inner horizontal beams may be attachable to the hinge assembly via insertion into corresponding slots thereon and may be secured in place via a quick connect/disconnect mechanism, and wherein the inner ends of the plurality of inclined beams may be attachable to the base mast section and the outer horizontal beams may be attachable to outer ends of the radially extending inner horizontal beams via quick connect/disconnect mechanisms. The quick connect/disconnect mechanism for securing the inner ends of the plurality of radially extending horizontal beams within the corresponding slots of the hinge assembly may include a removable pin, and wherein the quick connect/disconnect mechanism for attaching the inner ends of the plurality of inclined beams to the base mast section and for attaching the outer horizontal beams to outer ends of the radially extending inner horizontal beams may include a cam lever fastener.

In another embodiment, the disclosed subject matter provides a method of deploying a lightning protection system. The method may include providing a lightning protection system, wherein the lightning protection system may include a multi-section conductive mast assembly including at least a base mast section and a top mast section; an air terminal attachable to the top mast section; and a base assembly attachable to the base mast section via a hinge assembly, wherein the hinge assembly is configured to allow the base mast section to hinge relative to the base assembly. The method may further include assembling the base assembly and multi-section conductive mast assembly; connecting the base mast section to the base assembly via the hinge assembly; positioning the base assembly to a desired location and securing in position; grounding the lightning protection system; and placing and securing the multi-section conductive mast assembly in an upright position using the hinge assembly.

In yet another embodiment, the disclosed subject matter provides a catenary lightning protection system. The system may include at least two lightning protection systems, each lightning protection system may include: a multi-section conductive mast assembly comprising at least a base mast section and a top mast section; an air terminal attachable to the top mast section; and a base assembly attachable to the base mast section. The system may further include a catenary wire connected between the at least two lightning protection systems. In one or more of the at least two lightning protection systems the base assembly may be attachable to the base mast section via a hinge assembly, wherein the hinge assembly may be configured to allow the base mast section to hinge relative to the base assembly.

In still yet another embodiment, the disclosed subject matter provides a method of deploying a catenary lightning protection system. The method may include providing at least two lightning protection systems, each lightning protection system may include a multi-section conductive mast assembly comprising at least a base mast section and a top mast section; an air terminal attachable to the top mast section; a base assembly attachable to the base mast section; and a catenary wire connected between the at least two lightning protection systems. The method may further include assembling the at least two lightning protection systems; positioning the at least two lightning protection systems a certain distance apart and securing in position; grounding the at least two lightning protection systems; and installing a catenary wire between the at least two lightning protection systems. In one or more of the at least two lightning protection systems the base assembly may be attachable to the base mast section via a hinge assembly, wherein the hinge assembly may be configured to allow the base mast section to hinge relative to the base assembly.

Certain aspects of the presently disclosed subject matter having been stated hereinabove, which are addressed in whole or in part by the presently disclosed subject matter, other aspects will become evident as the description proceeds when taken in connection with the accompanying Examples and Drawings as best described herein below.

BRIEF DESCRIPTION OF THE DRAWINGS

Figure 1:
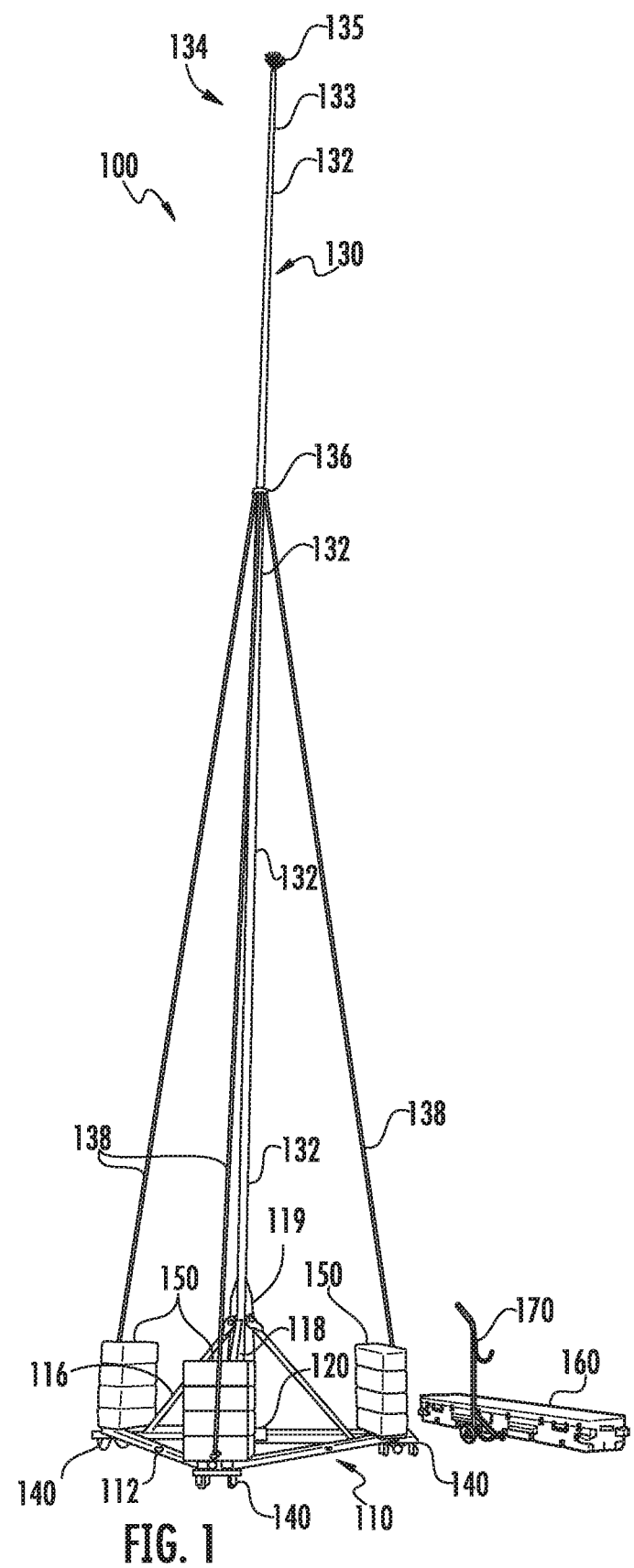
Figure 2:
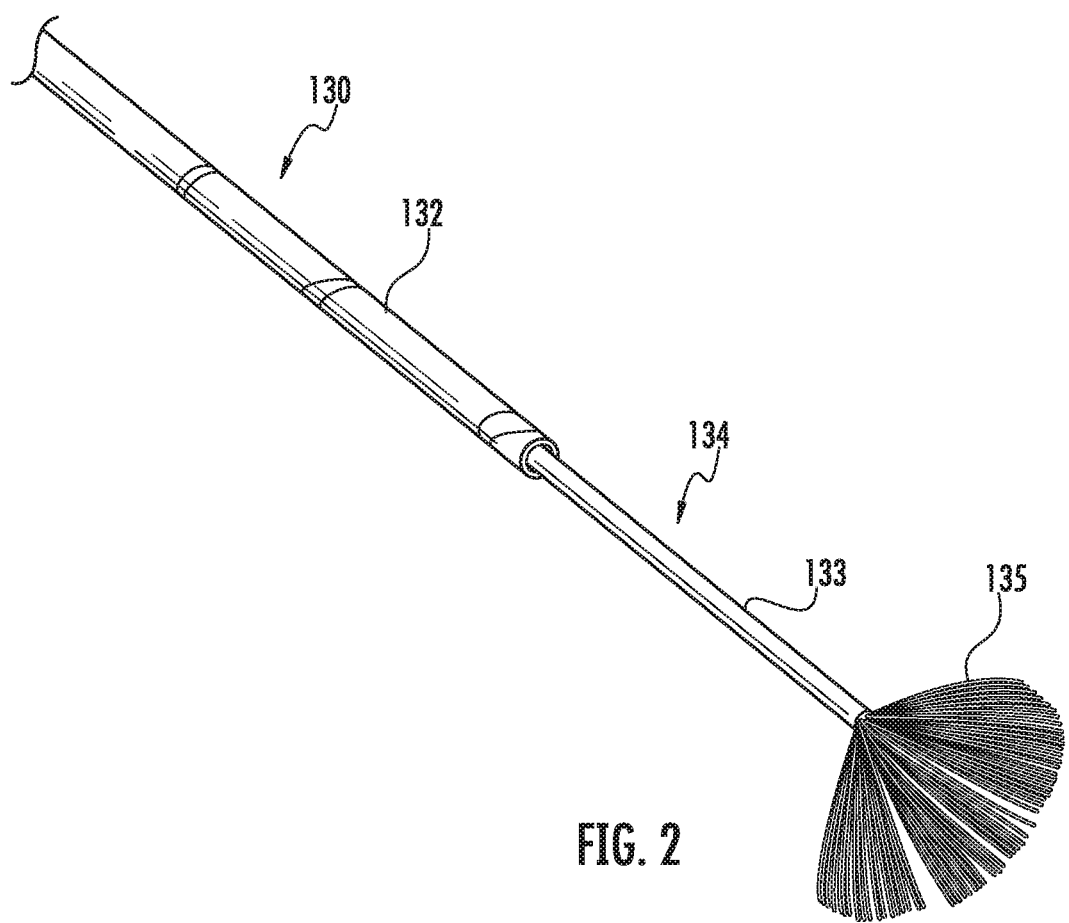
Figure 3:
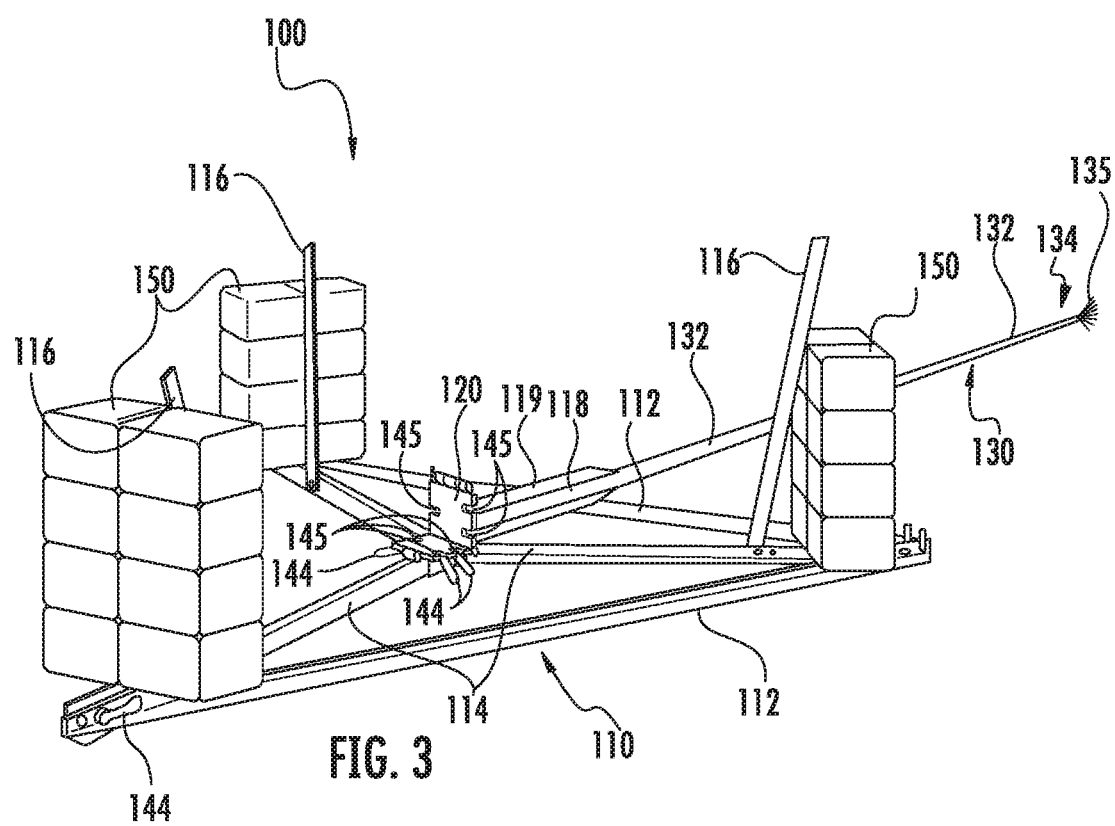
Figure 4:
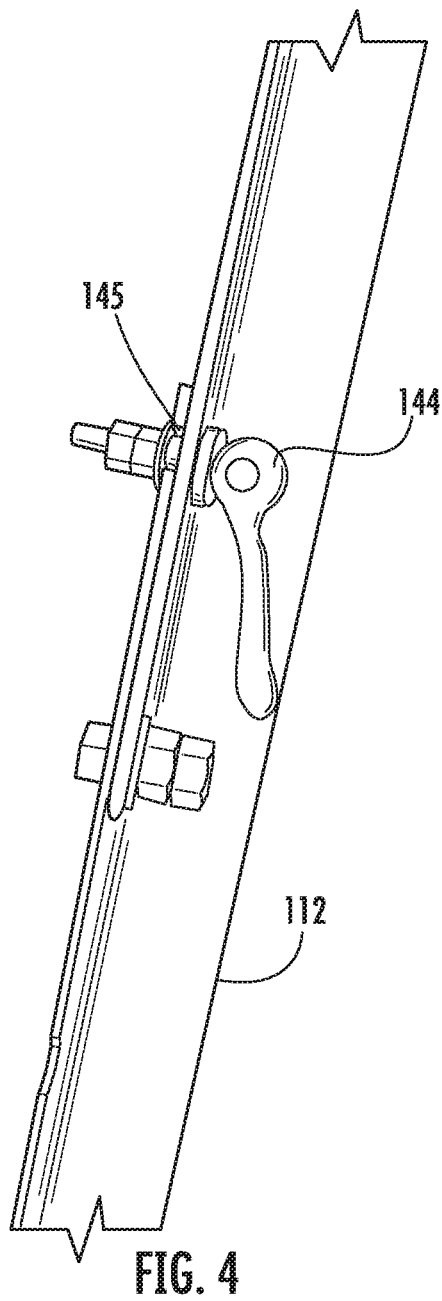
Figure 10:
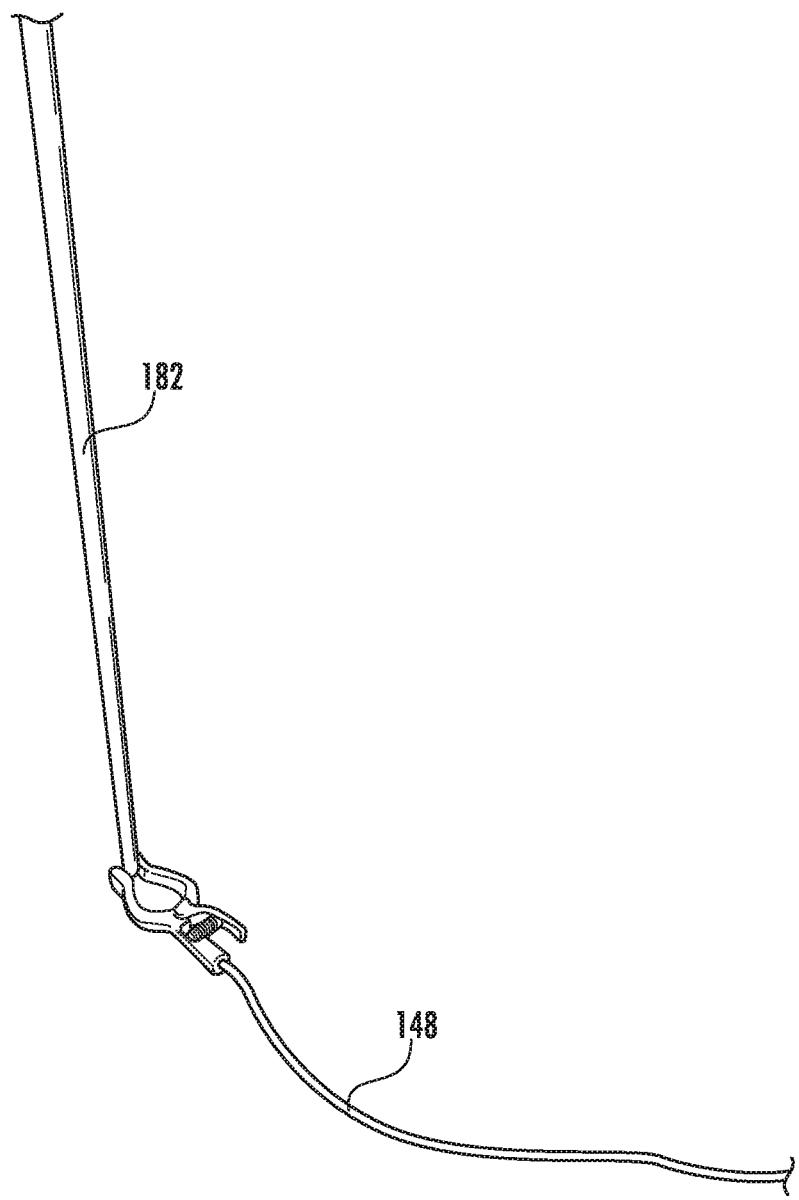
Figure 11:
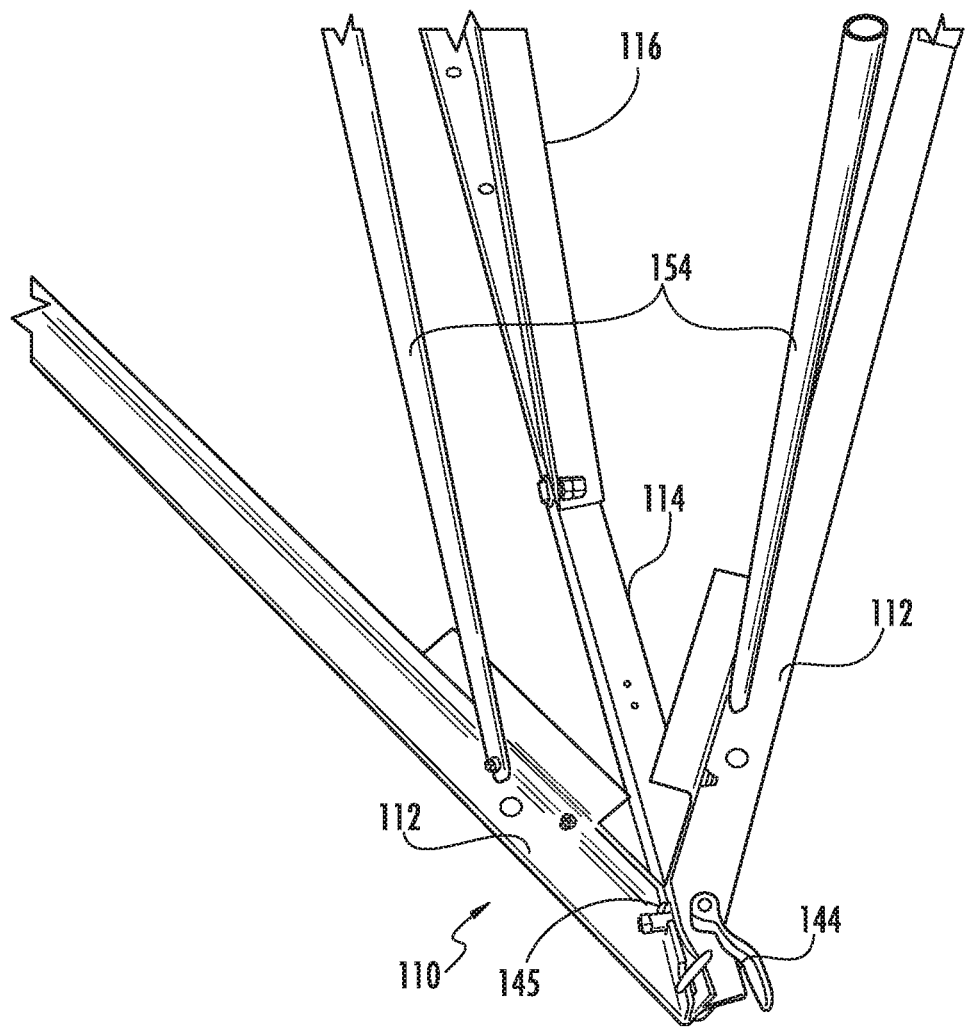
Figure 12:
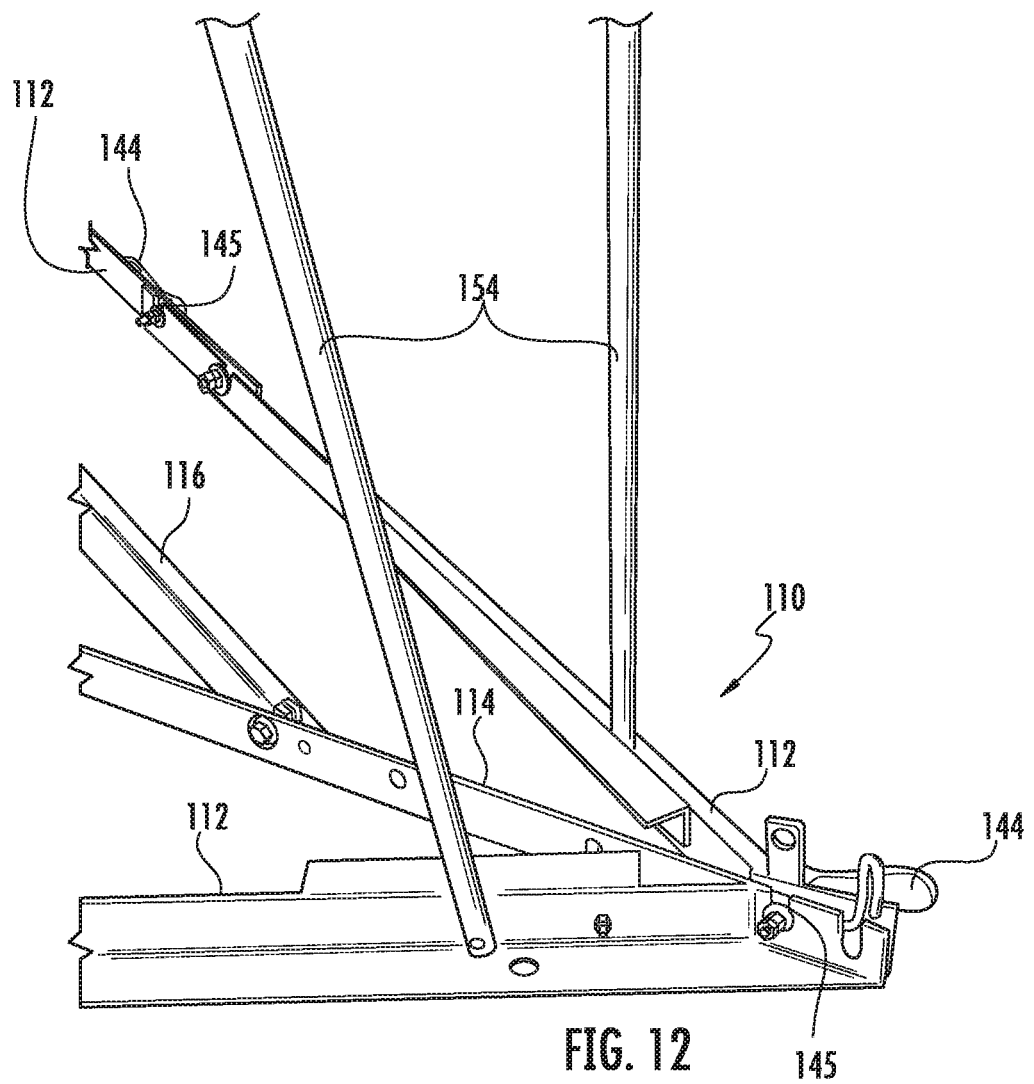
Figure 13:
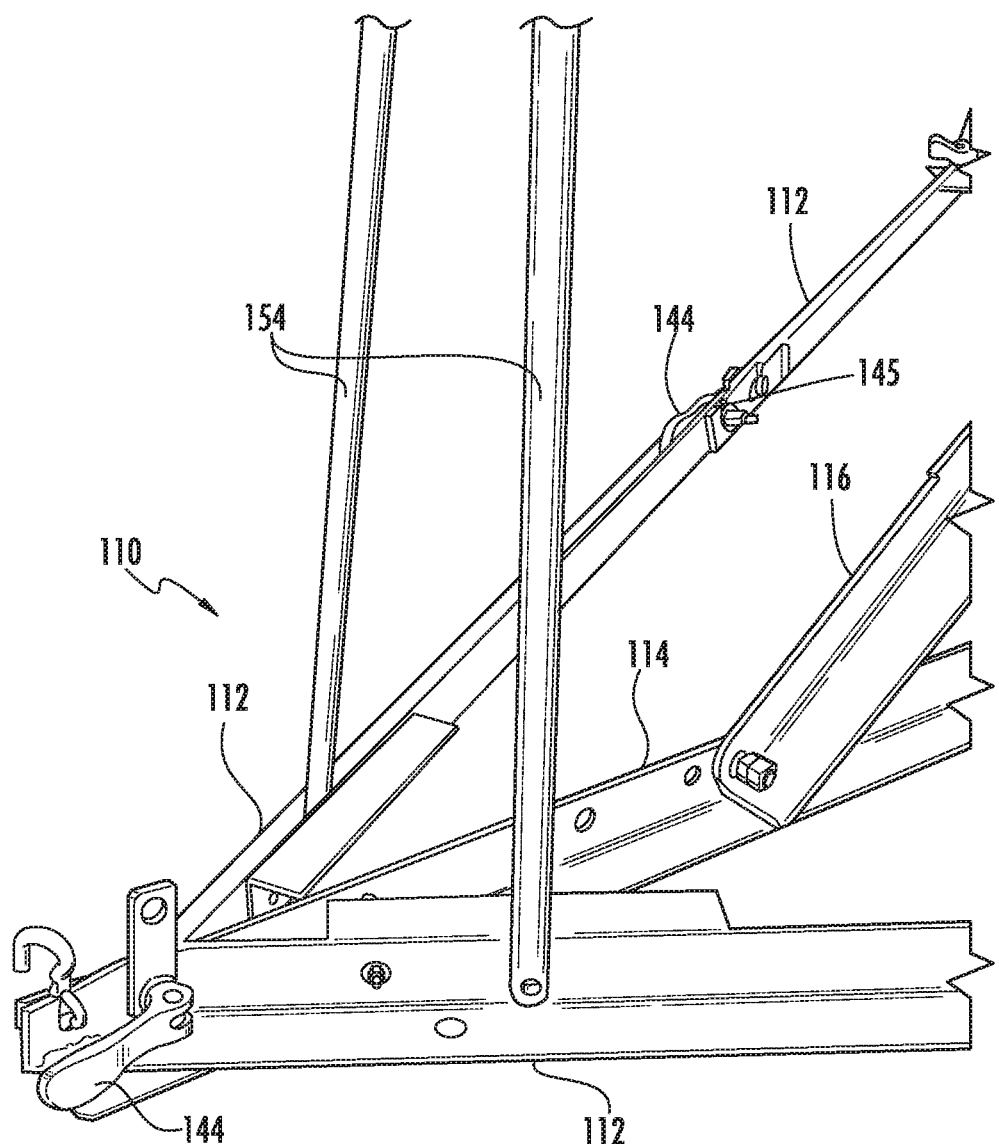
Figure 14:
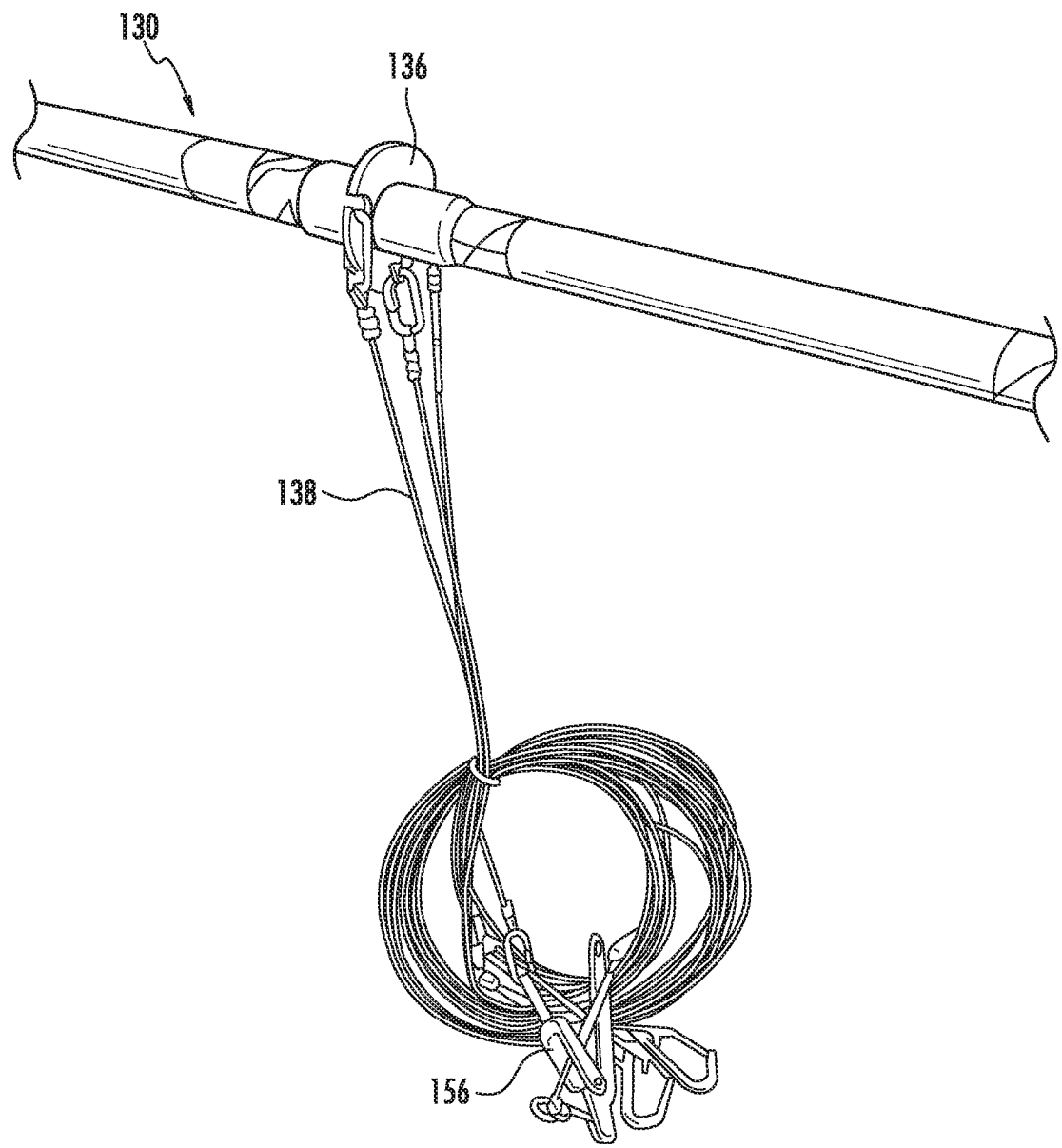
Figure 15:
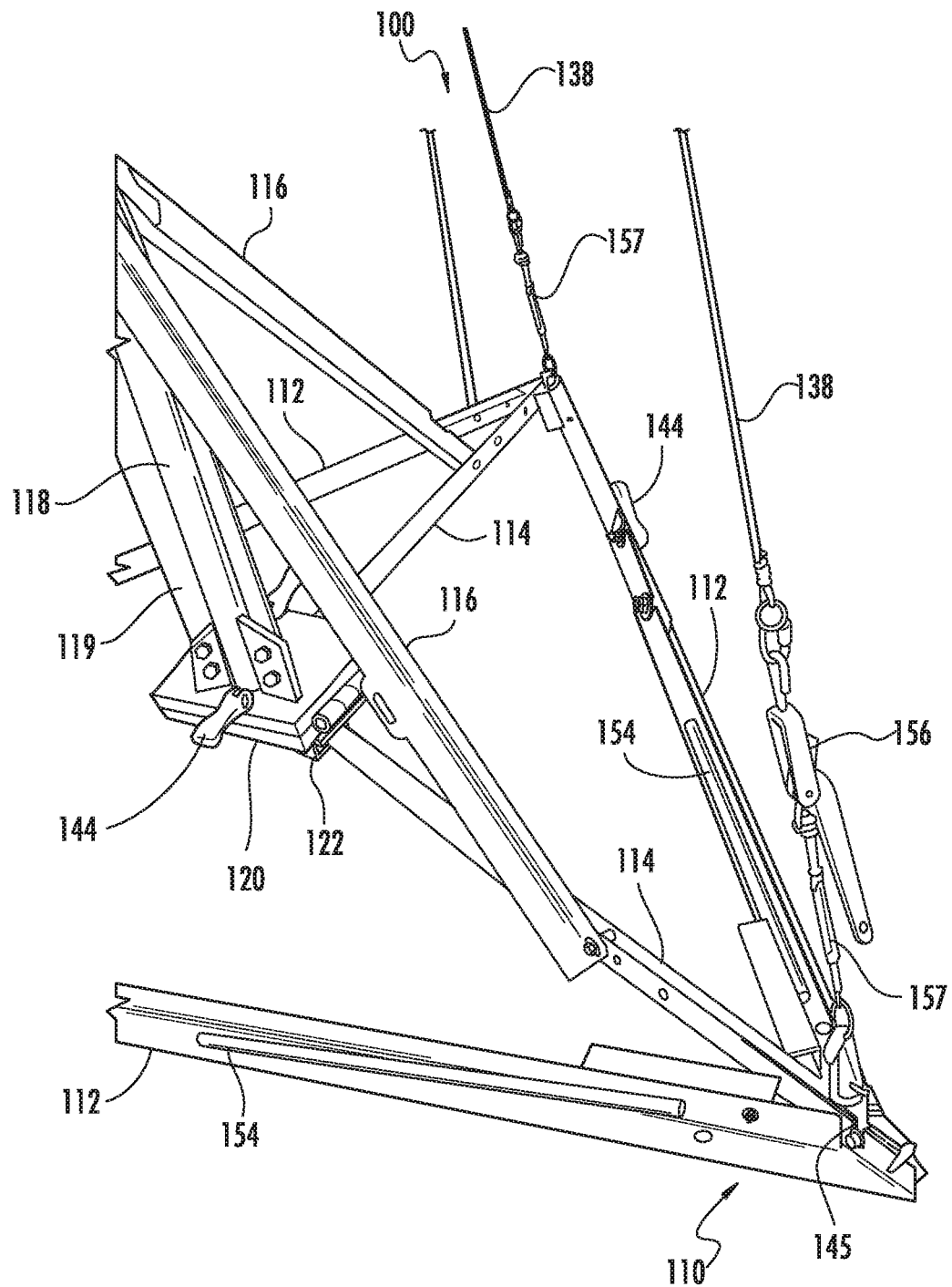
Figure 16:
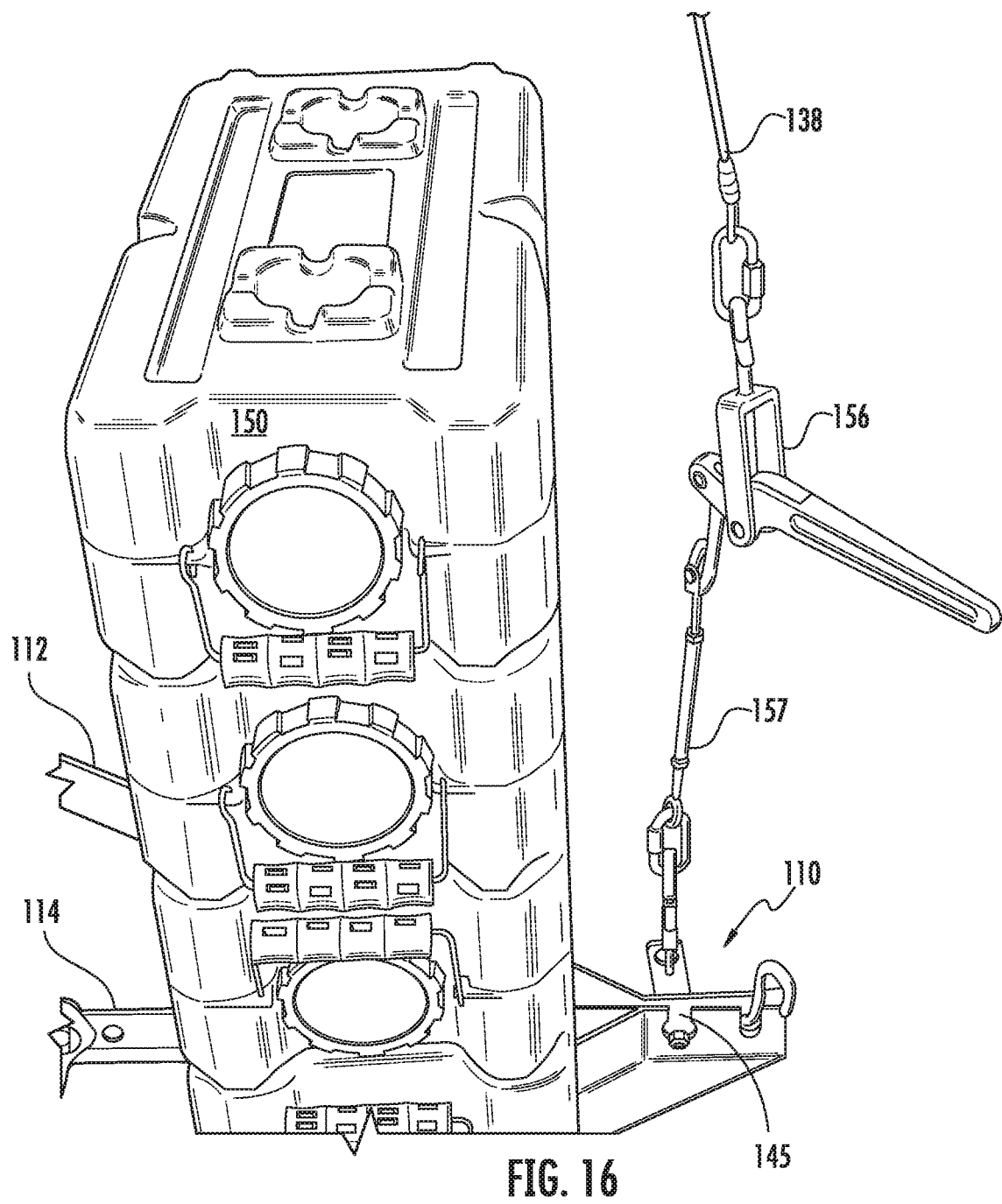
Figure 17:
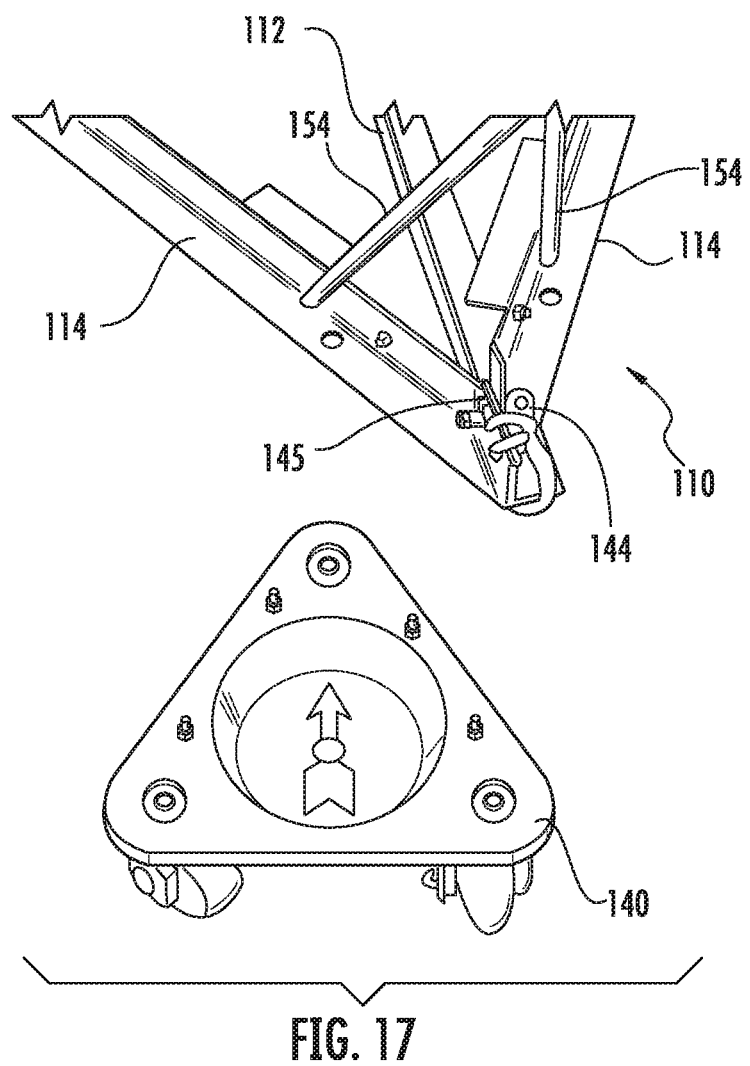
Figure 18:
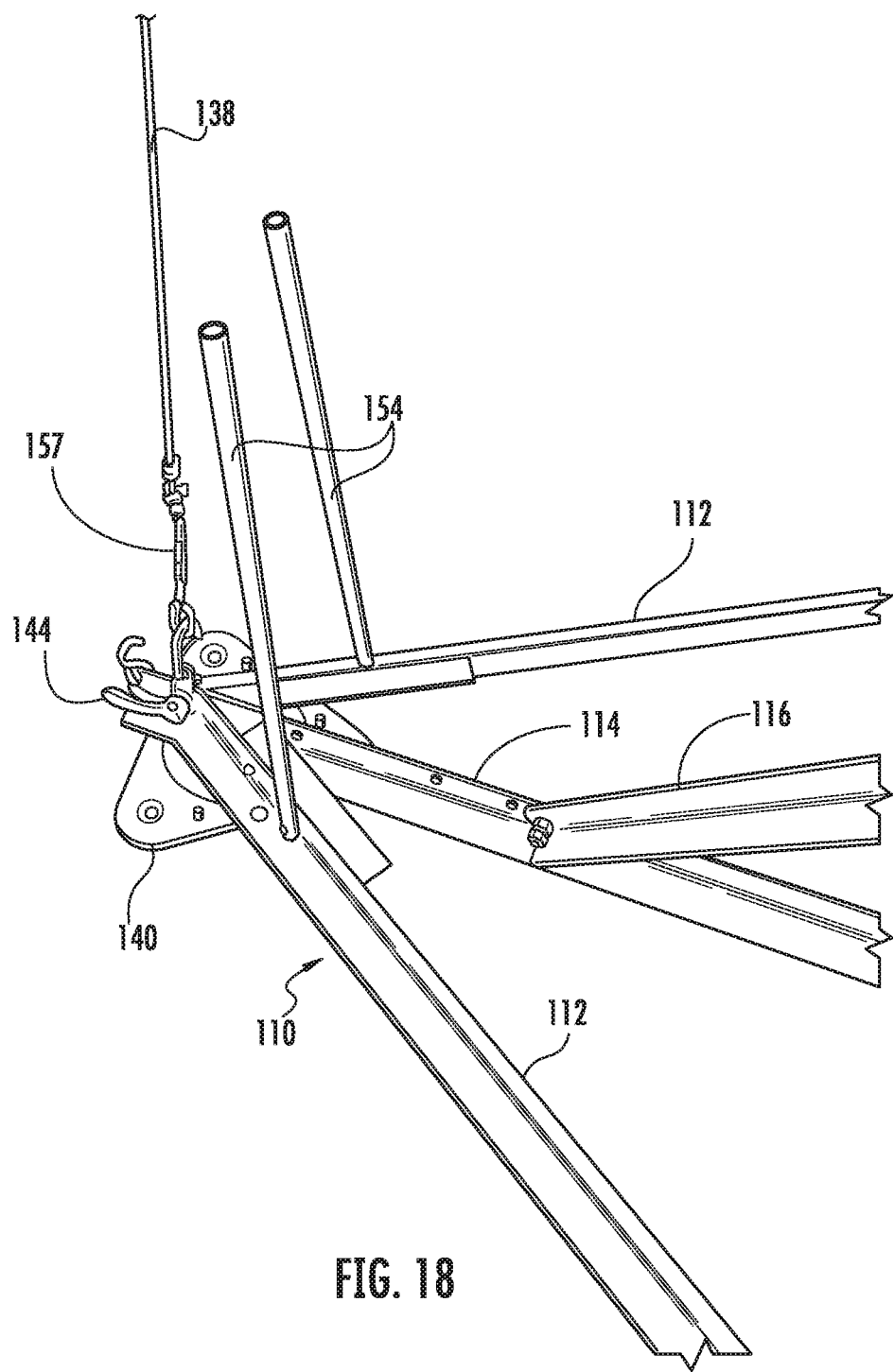
Figure 19:
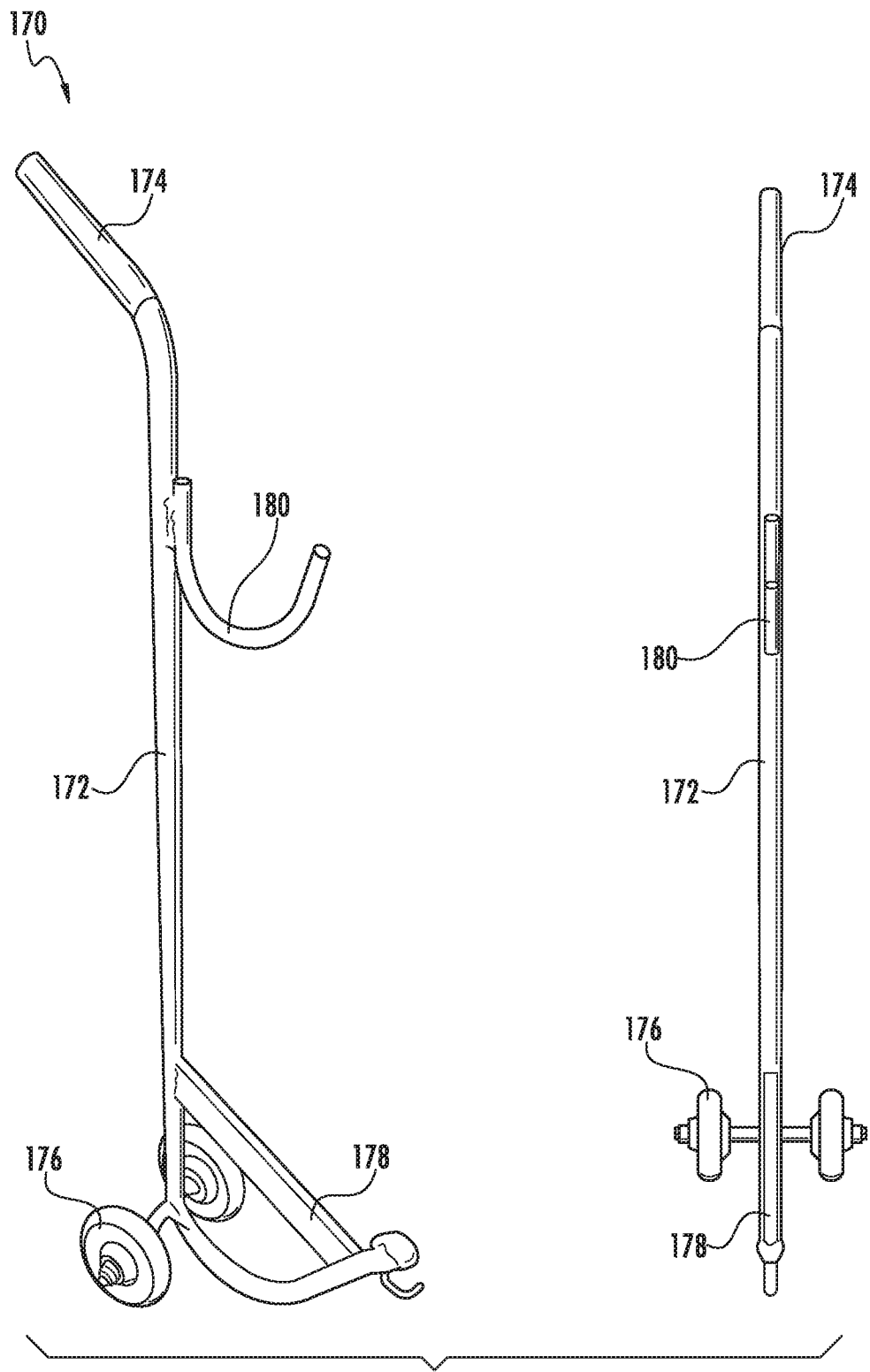
Figure 20:
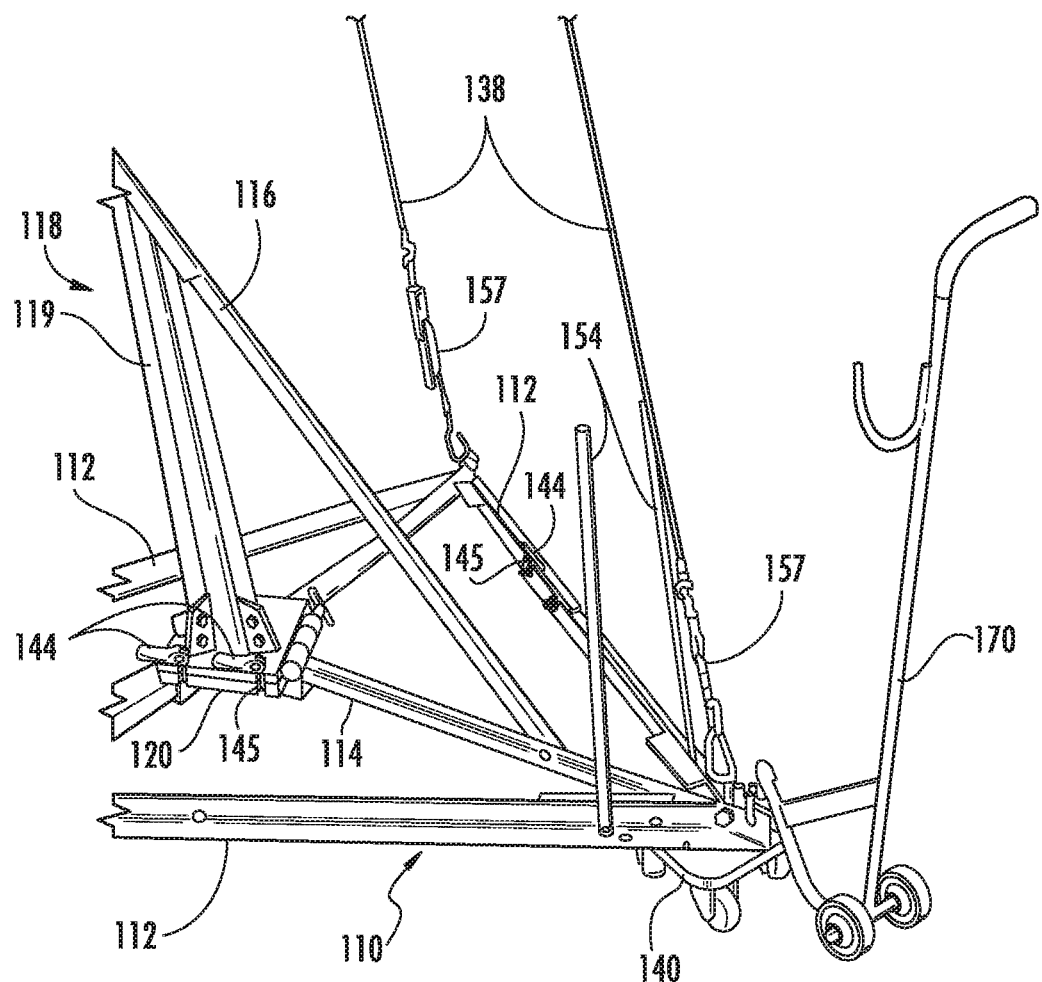
Figure 21:
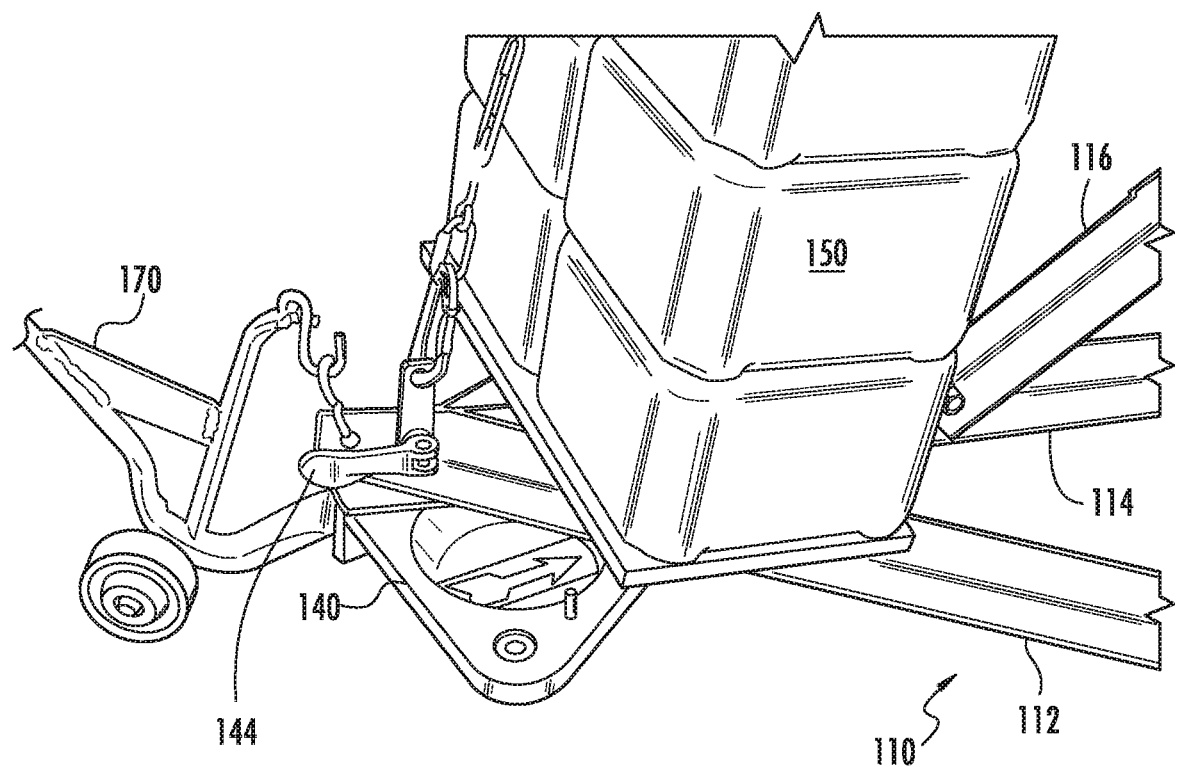
Figure 22:
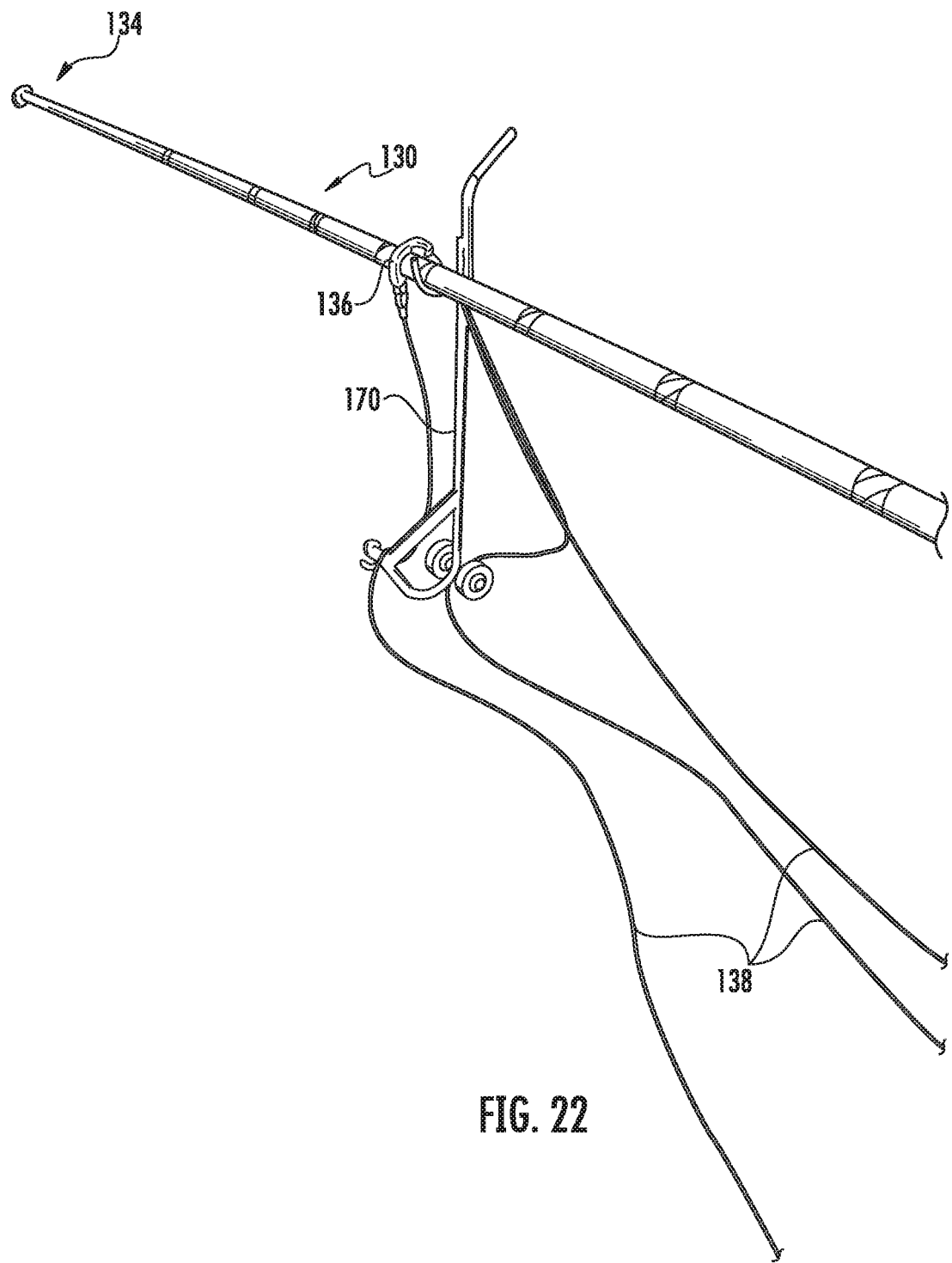
Figure 23:
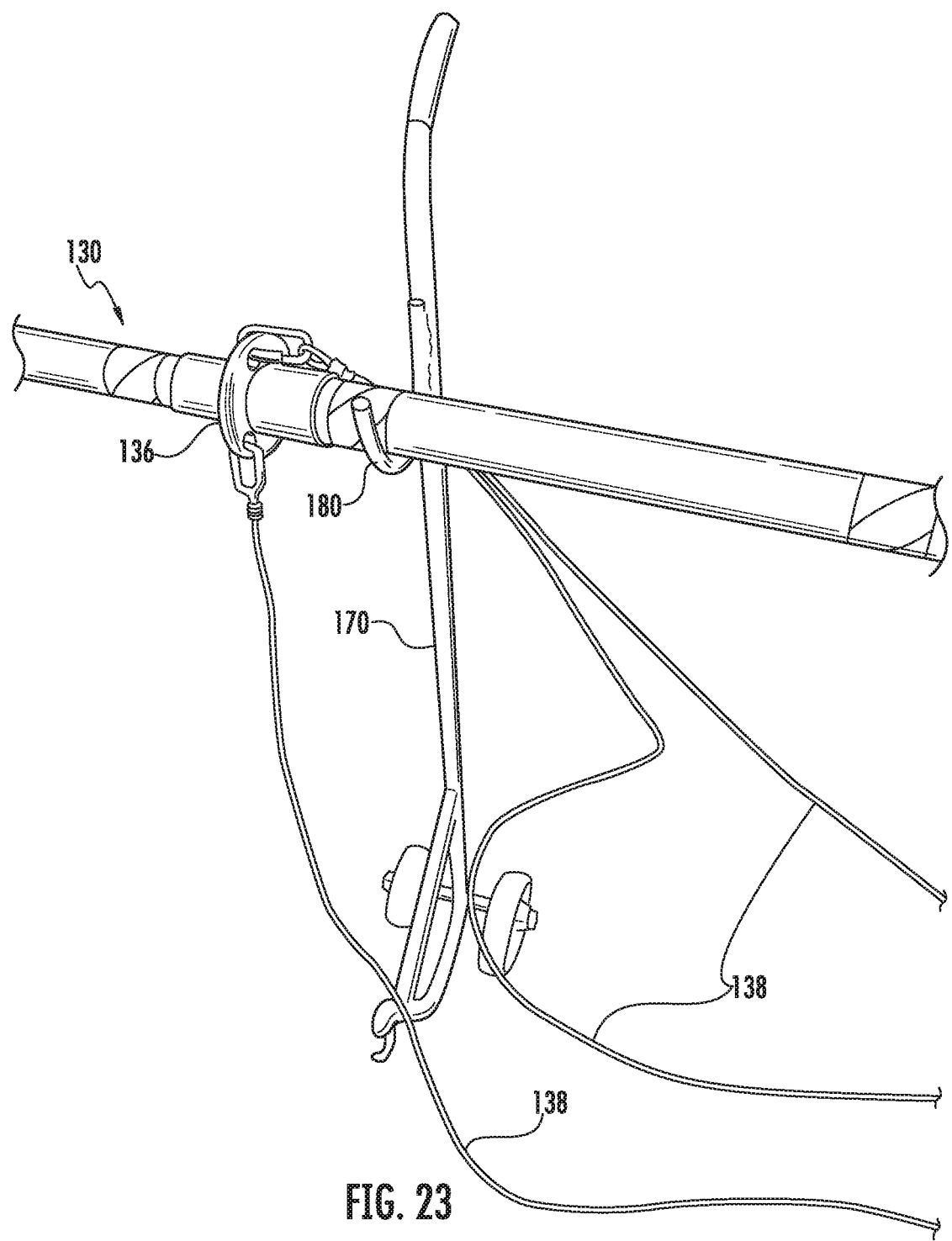
Figure 24:
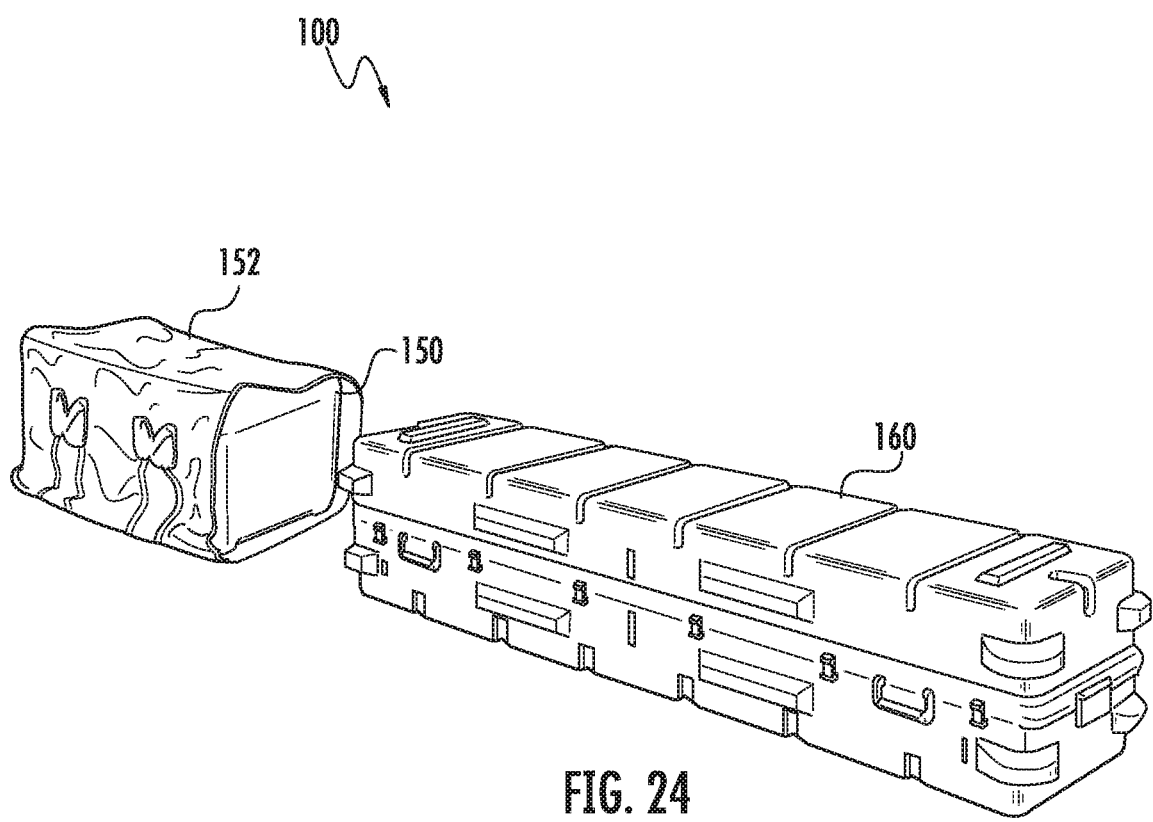
Figure 25:
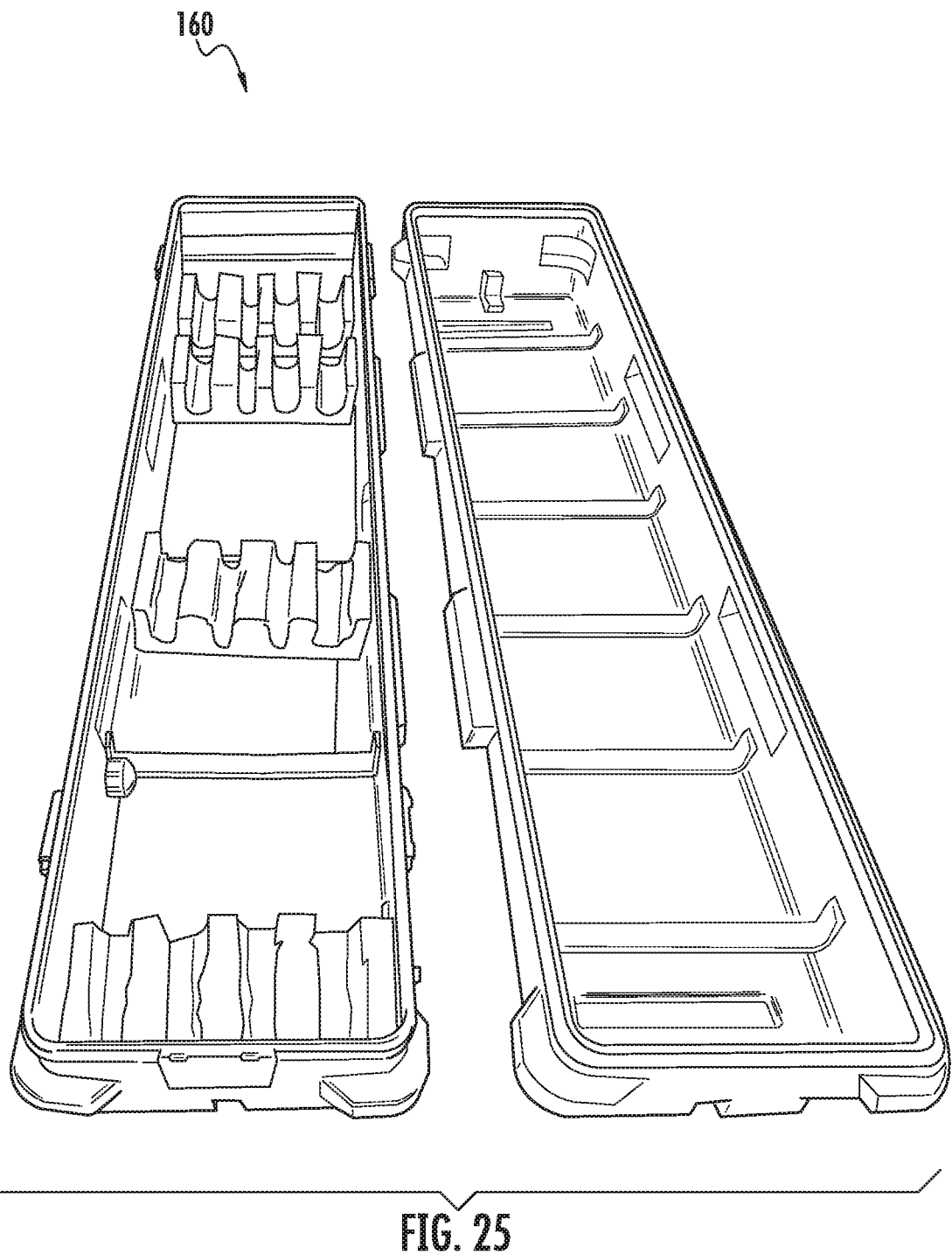
Figure 26:
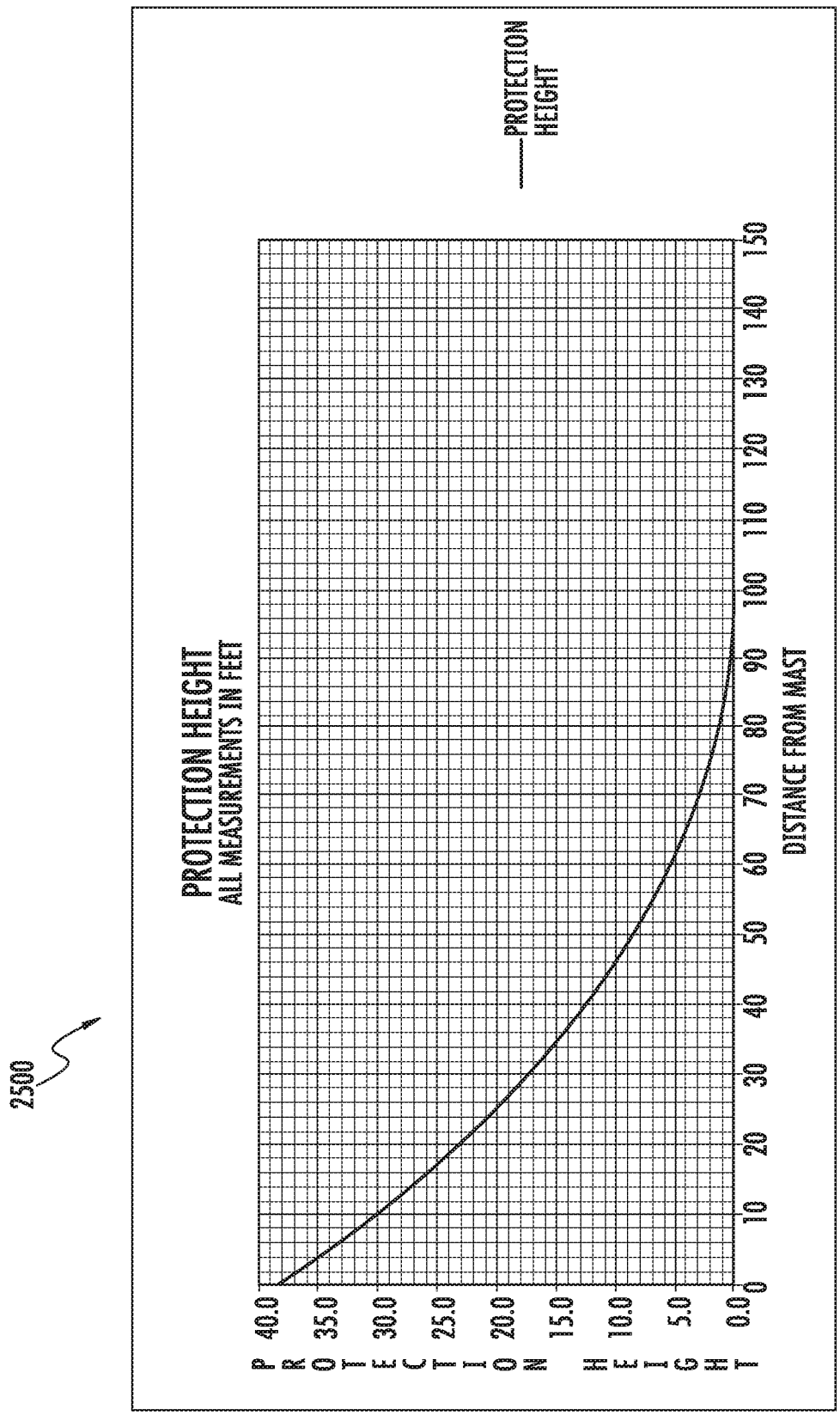
Figure 27:
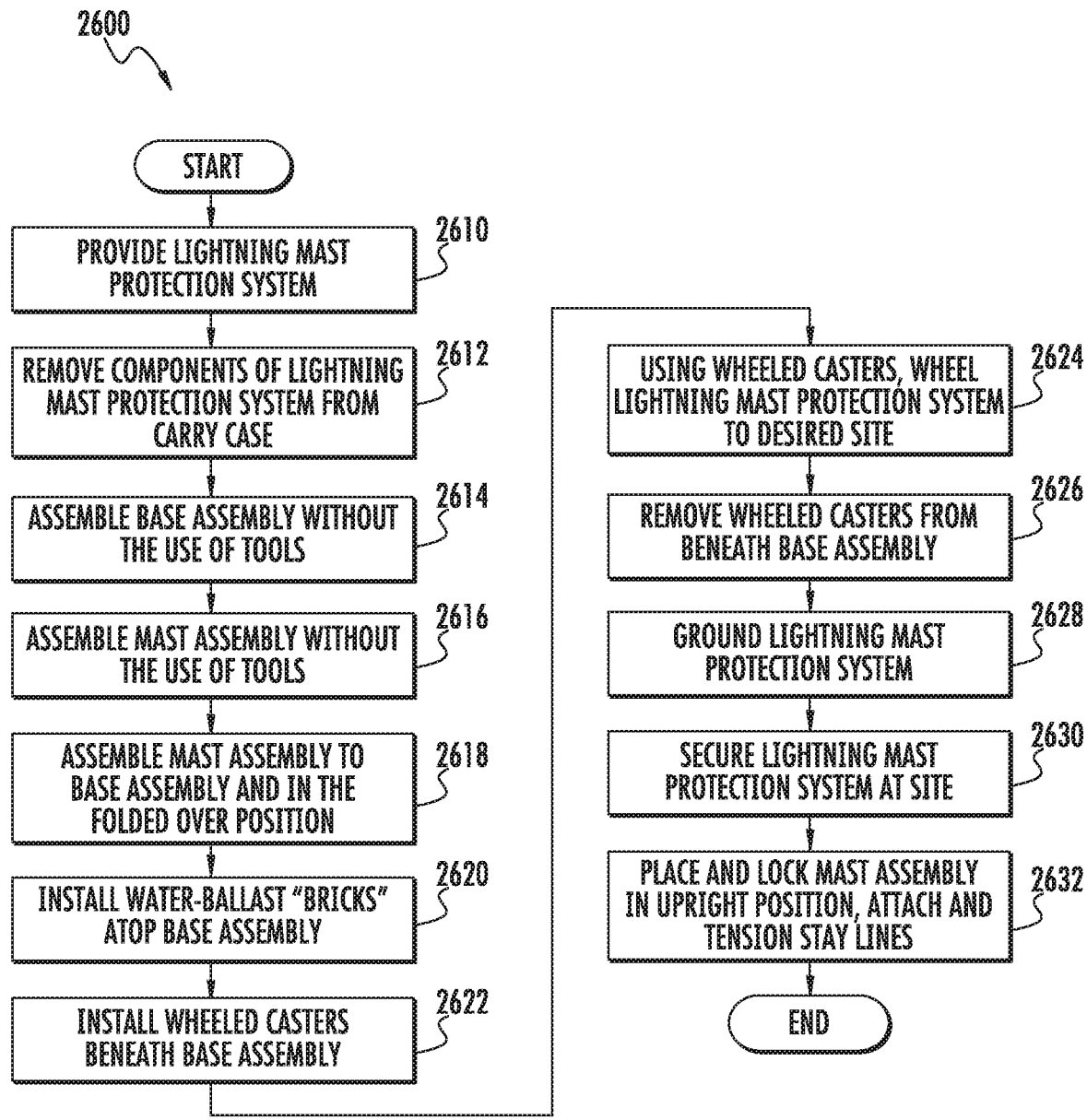
Figure 28:
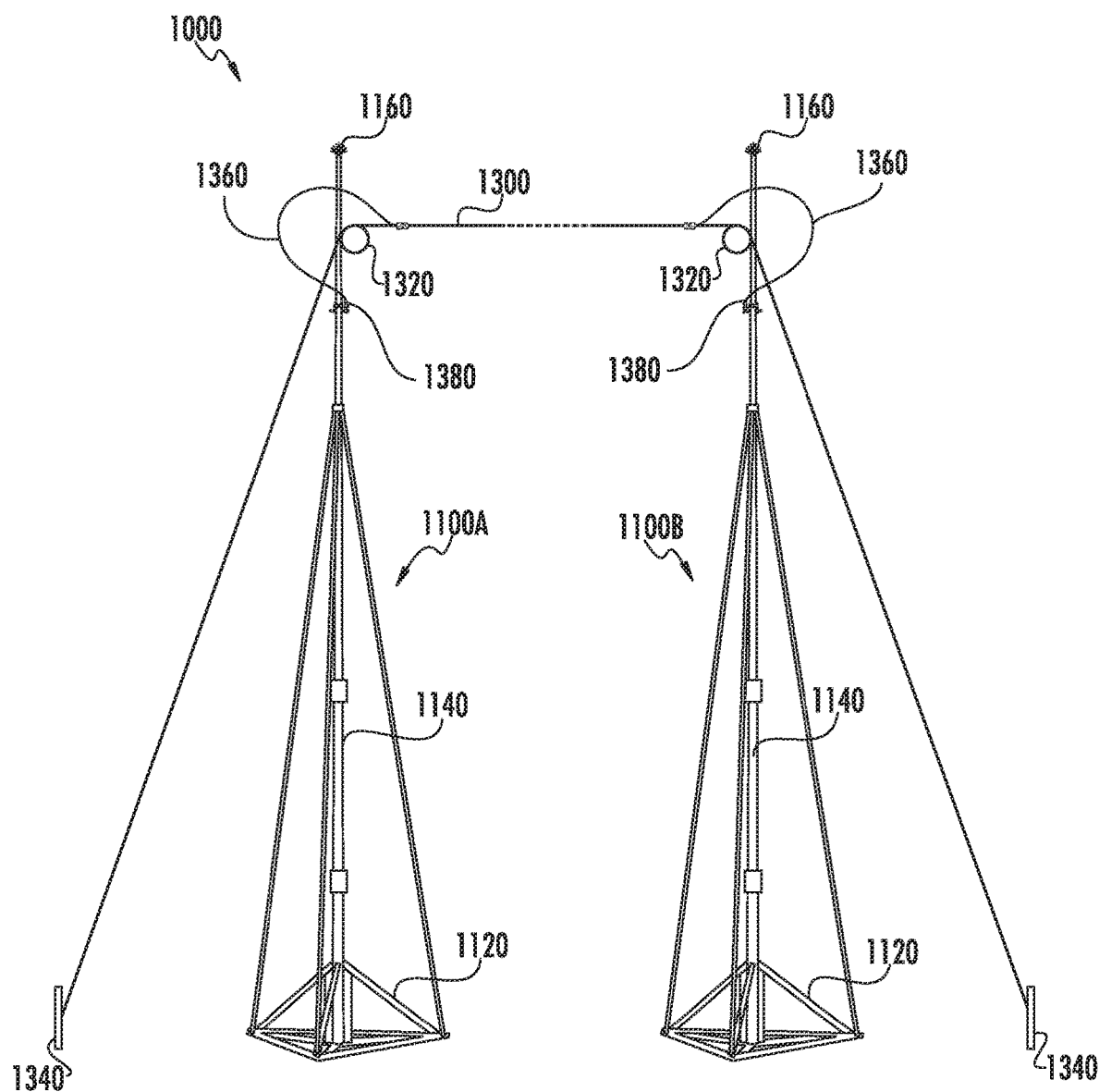
Figure 29:
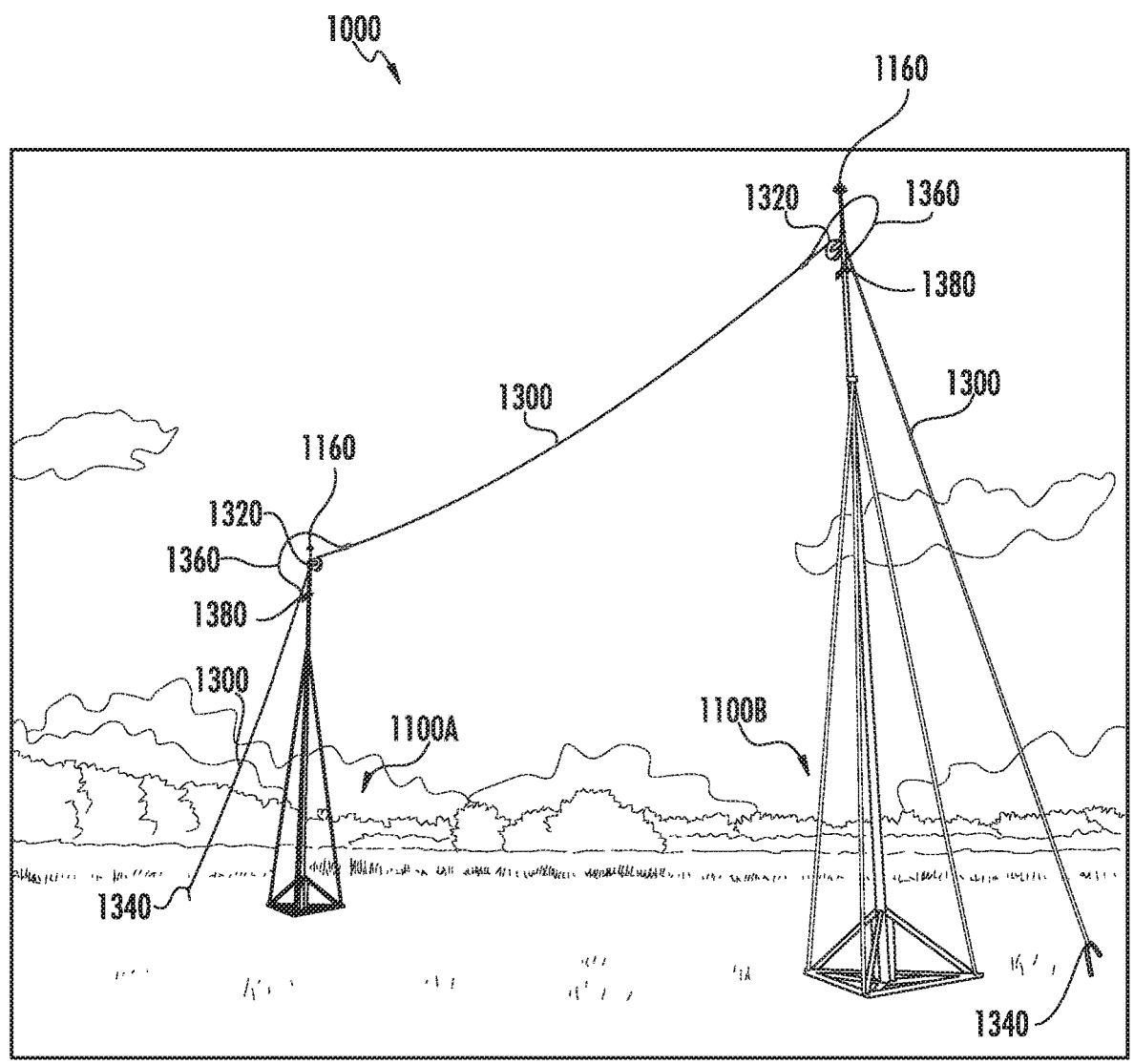
Figure 30:
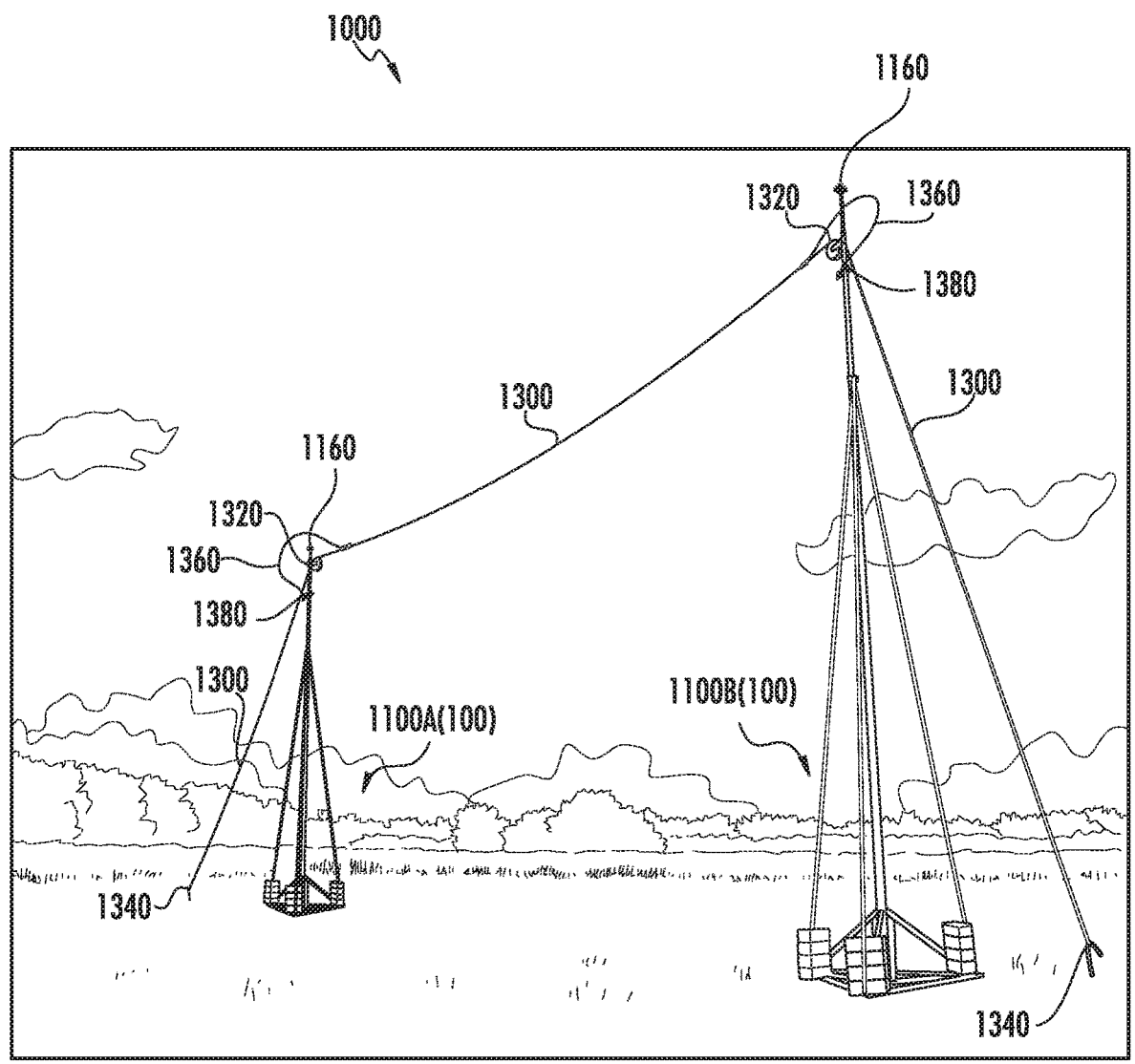
Figure 31:
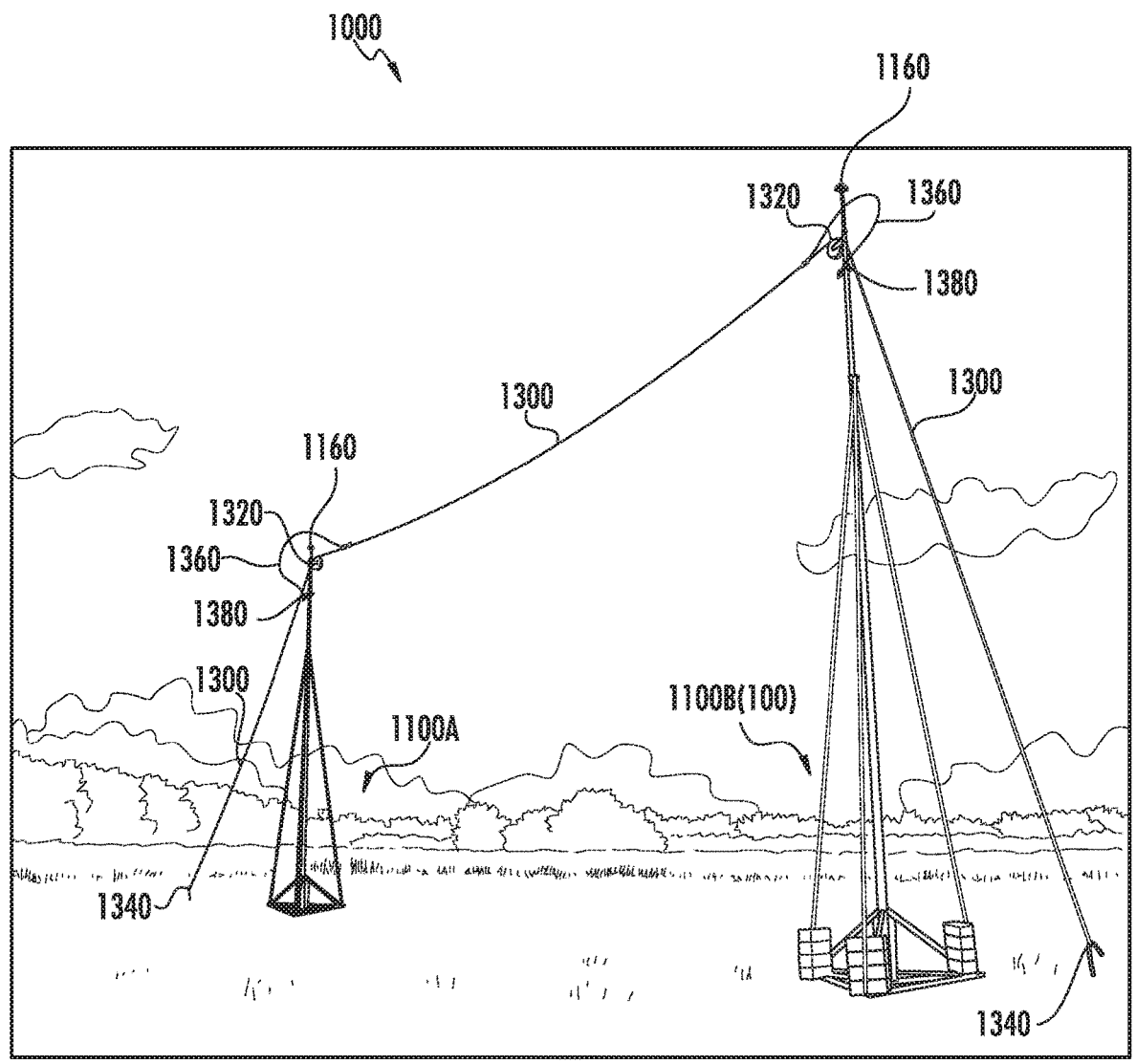
Figure 32:
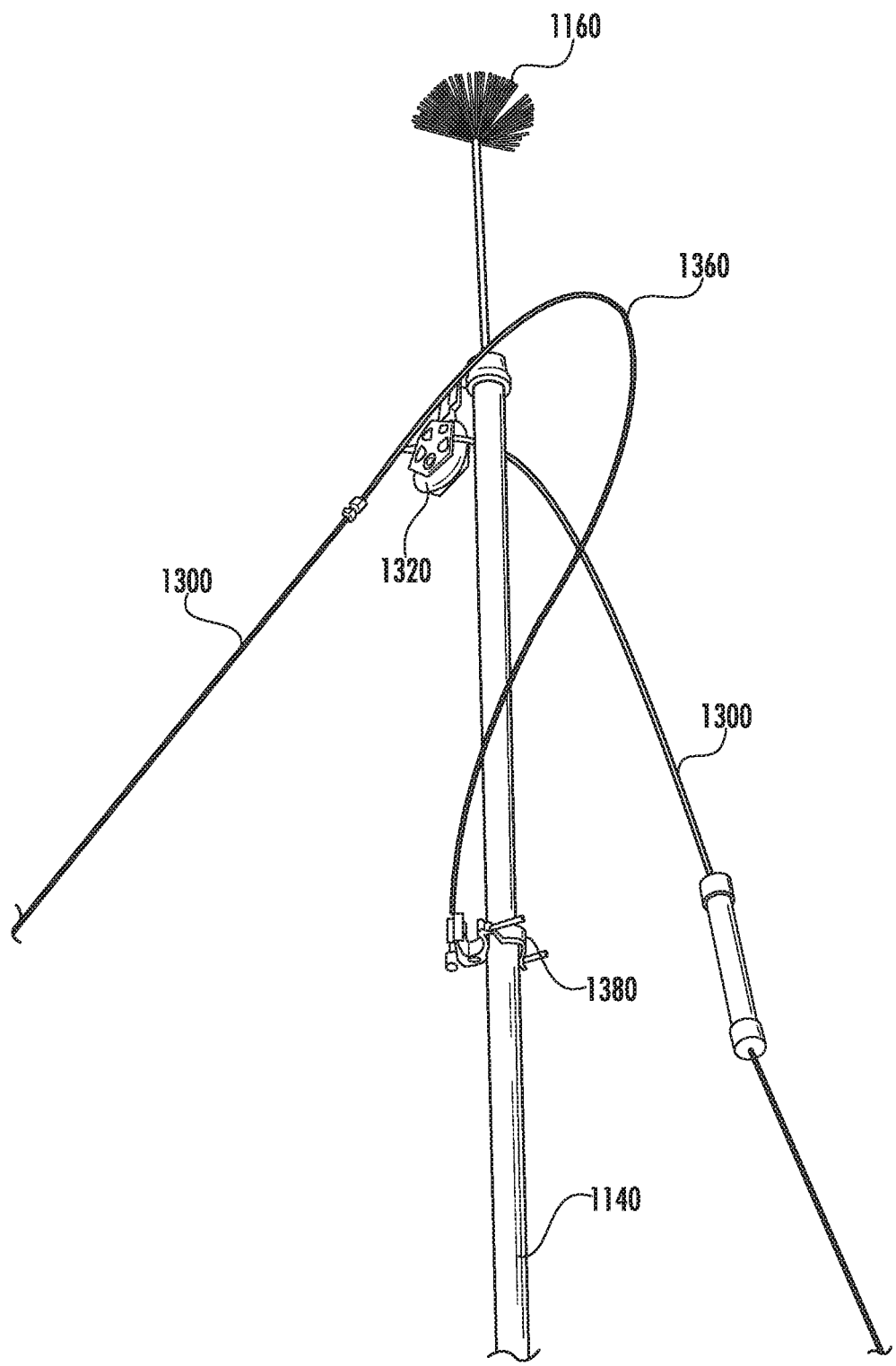
Figure 33A:
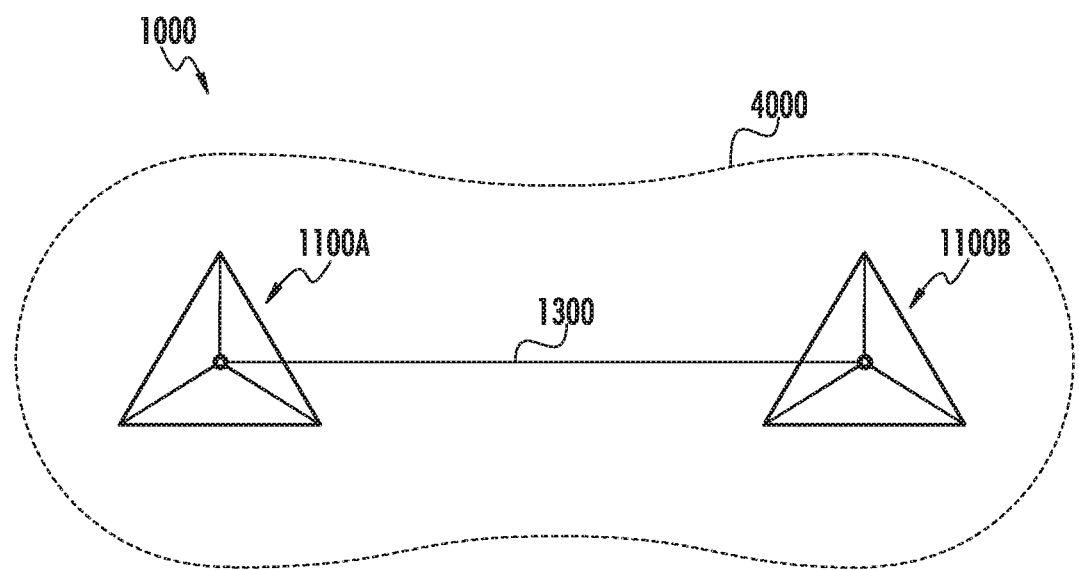
Figure 33B:
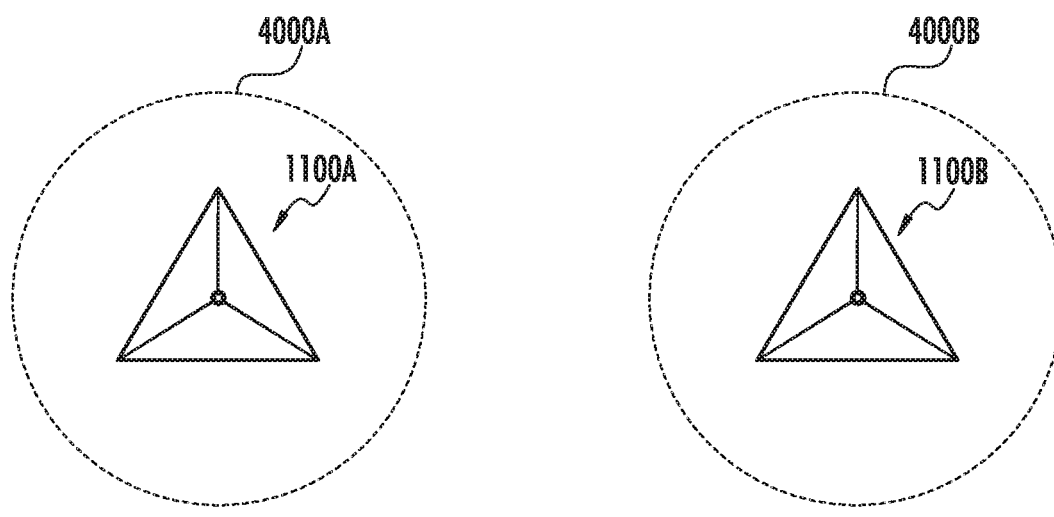
Figure 34:
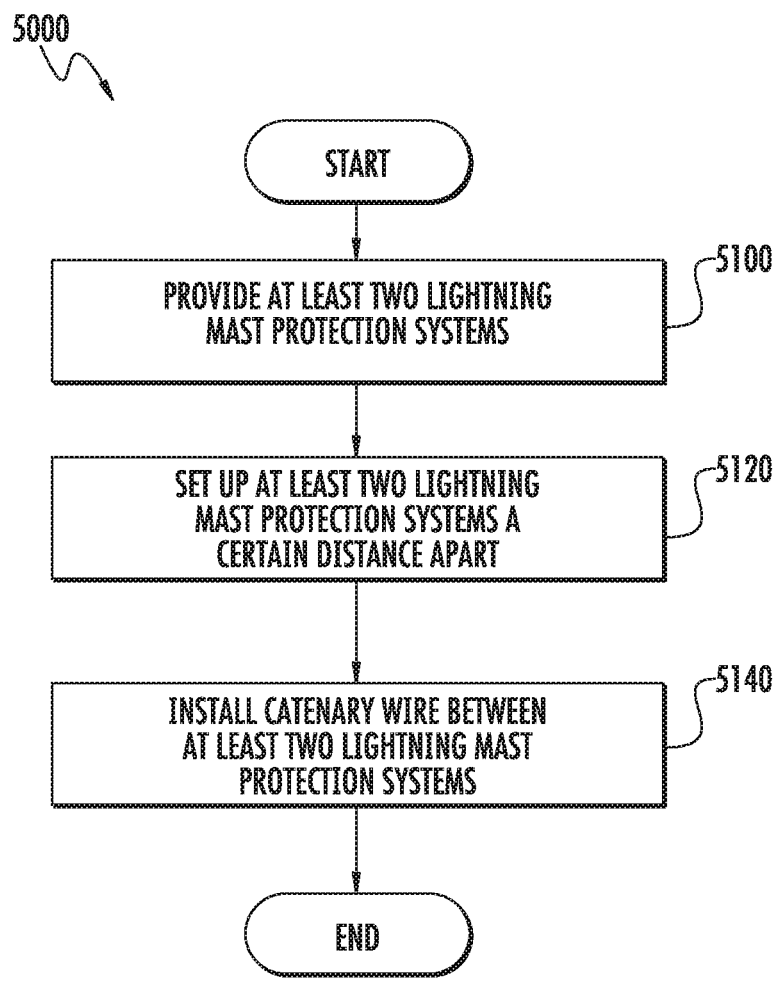

Having thus described the presently disclosed subject matter in general terms, reference will now be made to the accompanying Drawings, which are not necessarily drawn to scale, and wherein:

FIG. 1 illustrates a modular lightning protection system when fully deployed in an upright position in accordance with an embodiment of the invention;

FIG. 2 illustrates an example of an air terminal of the modular lightning protection system;

FIG. 3 illustrates the modular lightning protection system in a folded over configuration in accordance with an embodiment of the invention;

FIG. 4 illustrates an example of a cam lever fastener, several of which are used for assembling/disassembling the modular lightning protection system without the use of tools;

FIG. 5 through FIG. 9 illustrates an example of a base assembly and a hinge assembly of the modular lightning protection system;

FIG. 10 illustrates an example of a ground rod of the modular lightning protection system;

FIG. 11 through FIG. 13 illustrates details of a corner portion of the base assembly of the modular lightning protection system;

FIG. 14 illustrates an example of guy wires of the modular lightning protection system prior to be deployed in an upright position;

FIG. 15 and FIG. 16 illustrate examples of installing the guy wires of the modular lightning protection system;

FIG. 17 and FIG. 18 illustrates an example of a wheeled caster of the modular lightning protection system;

FIG. 19 illustrates an example of a handcart to facilitate movement and placement of the modular lightning protection system;

FIG. 20 and FIG. 21 illustrate examples of using the handcart to install the wheeled caster with respect to the base assembly of the modular lightning protection system;

FIG. 22 and FIG. 23 illustrate examples of using the handcart to cradle a mast assembly of the modular lightning protection system;

FIG. 24 illustrates an example carry case of the disclosed modular lightning protection system;

FIG. 25 illustrates an example of the inside of the carry case of the modular lightning protection system;

FIG. 26 illustrates a graphical plot of a zone of protection of the modular lightning protection system based on height;

FIG. 27 illustrates a flow diagram of an example method of deploying the modular lightning protection system in accordance with an embodiment of the invention;

FIG. 28 illustrates a side view of a catenary lightning protection system comprising at least two lightning protection systems connected by a catenary wire in accordance with an embodiment of the invention;

FIG. 29 illustrates another view of the catenary lightning protection system comprising at least two lightning protection systems connected by a catenary wire;

FIG. 30 illustrates another view of the catenary lightning protection system comprising at least two lightning protection systems connected by a catenary wire in accordance with another embodiment of the invention;

FIG. 31 illustrates another view of the catenary lightning protection system comprising at least two lightning protection systems connected by a catenary wire in accordance with yet another embodiment of the invention;

FIG. 32 illustrates a portion of the catenary lightning protection system and catenary wire in accordance with an embodiment of the invention;

FIG. 33A and FIG. 33B illustrate example schematic diagrams of the catenary lightning protection system showing, an exemplary protection zone thereof with and without the catenary wire, respectively in accordance with an embodiment of the invention; and FIG. 34 illustrates a method of deploying the catenary lightning protection system in accordance with an embodiment of the invention.

DETAILED DESCRIPTION

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides a modular lightning protection system comprising a modular mobile platform and method of deploying same. In one embodiment the lightning protection system is a modular, stand-alone, fully integrated, portable lightning protection system, which may be in kit form for rapid assembly and deployment, as well as for longer term applications for a wide spectrum of special protection needs. The lightning protection system is preferably designed for quick installation as a reusable, modular mobile platform for easy assembly and movement in the desired operational area. The lightning protection system may include a lightweight, rugged aluminum alloy mast, a mobility-enabled base assembly, customer specified grounding attachment components, and a UL-listed air terminal. The lightning mast components are preferably modular and short enough in length for easy stowing, for example, in a hard carry case.

In some embodiments, the presently disclosed subject matter provides a lightning protection system comprising at least two, preferably portable, lightning protection systems connected by a catenary wire and method of deploying same. Namely, in such a lightning protection system, the two lightning protection systems connected by a catenary wire have a combined lightning protection zone that is larger than the combined lightning protection zones of two lightning protection systems absent the catenary wire. Accordingly, the presence of the catenary wire connecting the two lightning protection masts serves to provide a substantially continuous and expanded lightning protection zone as compared with the two separate lightning protection zones of two lightning protection systems absent the catenary wire.

In some embodiments of the lightning protection system, the base assembly may incorporate water-ballast "bricks" for ballast. A carry case, such as a soft carry case, may be provided for storage and transport of the (empty) water bricks. Alternatively, any suitable weighted device, such as sand bags, blocks, weights, and the like, may be used in place of, or in conjunction with, the water bricks. In addition to general field use, the base assembly may be suitable for non-penetrating application on hard surfaces, rooftops, and/or other critical or non-penetrable surfaces.

The lightning protection system is preferably capable to withstand wind gust loads equivalent to about 120 mph (193.1 kph), and potentially greater. Further, all system components are preferably corrosion resistant and suitable for indefinite deployment periods in sea coast and/or other challenging environments.

The function of the lightning protection system is to provide a highly conductive, portable, and easily deployed structure to deter and terminate lighting strikes that may threaten assets and personnel under its cone of protection. The lightning protection system may further include air terminal static discharge technology to reduce the probability of lightning strikes, and serves as an air terminal for lightning strike termination when required, for example as a UL Listed air terminal. Static discharge technology lowers the exposure to a direct lightning strike by controlling the conditions that trigger direct strike (i.e., reduces the build-up of static ground charge and retards the formation of the ion "streamers" that complete the path for a lightning strike). The lightning protection system employs the point-discharge principle to continually leak off the lightning-causing ground potential over a long period of time instead of the short duration, powerful discharge occurring with a lightning strike.

An example of one specific use of lightning protection system is a military airfield where there are a number of multi-million dollar aircraft sitting on an open tarmac and out in the open and susceptible to lightning strikes. However, the presently disclosed modular lightning protection system can be used in any number of civilian and/or military applications.

Referring now to FIG. 1 illustrates an example of a modular lightning protection system 100 in accordance with an embodiment of the invention in a fully deployed position. The modular lightning protection system 100 includes a base assembly 110 that supports a base mast section 118. Base mast section 118 is the lower most mast section of mast assembly 130. Mast assembly 130 is hingeably coupled to base assembly 110 at a bottom of base mast section 118 via a hinge assembly 120. The mast assembly 130 includes a plurality of mast sections 132 that are coupled end-to-end. In one example, the mast sections 132 are coupled end-to-end via threaded couplers (not shown). However, the mast sections 132 may be coupled together via any suitable mechanism and/or technique. The cross-sectional diameter of the mast assembly 130 may vary from larger to smaller from bottom to top. Accordingly, there may be a certain order of the mast sections 132. The base mast section 118 and the mast sections 132 of the mast assembly 130 may be formed, for example, of lightweight, rugged, aluminum alloy, or other suitable material.

Further, an air terminal 134 may be installed at the uppermost end of the mast assembly 130. For example and referring now to FIG. 2 illustrates an example of air terminal 134. The air terminal 134 preferably includes a conductive rod 133 and may further include a brush 135 comprised of a plurality of fine conductive wires. In one embodiment, air terminal 134 may be a brushless terminal. The conductive rod 133 can be inserted into an axial bore extending downwardly from the top end of the uppermost mast section 132. However, the conductive rod 133 may be coupled/connected to the uppermost mast section 132 via any suitable mechanism and/or technique.

Additionally, the mast sections 132 of the mast assembly 130 (and/or the air terminal 134) may be alodined, anodized, painted, and/or coated with any other protective coating that presents no impediment to the voltage of a lightning flash. Alodining (chemical conversion) is a coating method intended to provide corrosion prevention to aluminum products left unpainted, as well as to improve adhesion of painting processes. Anodizing is the electrochemical oxidation of an aluminum surface designed to produce a stable film of the aluminum's oxide on that surface.

The total height of the modular lightning protection system 100 may range, for example, in a range from about 14 ft. to about 40 ft., or any other suitable height range. Accordingly, each of the mast sections 132 may be in the range of from about 4 ft. to about 8 ft. long, or any other suitable length range. In one example, the total height of the modular lightning protection system 100 may be about 38 feet. For a 38-foot modular lightning protection system 100, the base mast section 118 may be about 3 feet long; the mast assembly 130 may include about 6 mast sections 132, each being about 6.5 ft. long; and the air terminal 134 may be about 1.5 ft. long. Further, in this example, the 38-foot modular lightning protection system 100 occupies a circular area that is about 10.8 ft. (3.3 m) in diameter.

The mast assembly 130 may be supported, for example, by stay lines (or guy wires) 138. In one example, three stay lines 138 may be used to support mast assembly 130. In one example, one end of the stay lines 138 may be connected to an upper region of the mast assembly 130, e.g., about two-thirds of the way up the mast assembly 130, and the other end of the stay lines 138 may be connected to the base assembly 110.

A set of wheeled casters 140 may be provided to impart mobility to the modular lightning protection system 100. For example, wheeled casters 140 may be provided, one for each corner of the base assembly 110. Using the wheeled casters 140, the modular lightning protection system 100 may be more easily moved to a desired location and then the wheeled casters 140 may be removed. Using the wheeled casters 140, the modular lightning protection system 100 may be moved with the mast assembly 130 in either the upright position or in the folded over position.

Further, the base assembly 110 may include a set of water-ballast "bricks" 150. The water-ballast "bricks" 150 provide weight to the base assembly 110 of the modular lightning protection system 100. However, other mechanisms, such as sand bags, blocks, weights, and the like, may be used to add weight to the base assembly 110 of the modular lightning protection system 100. In one example, water-ballast "bricks" 150 may hold about 3.3 gallons of water and have a weight of about 30 lbs. Accordingly, ground penetration is not necessarily required to set up the modular lightning protection system 100. Therefore, the modular lightning protection system 100 may be used on most any ground surface and/or potentially on top of a building structure. However, in some embodiments, instead of using weights, such as water-ballast "bricks" 150, ground spikes may be used to secure the base assembly 110 to the ground.

The modular lightning protection system 100 further may include a carry case 160 for holding and transporting the components of the modular lightning protection system 100 when disassembled. In one example, carry case 160 is a hard case (see FIGS. 24 and 25). Additionally, the modular lightning protection system 100 may also include a carry case 152 (see FIG. 24) for holding the water-ballast "bricks" 150, preferably in there empty state. In one example, carry case 152 is a soft case.

Further, the modular lightning protection system 100 may also include a multifunctional handcart 170. For example, and referring now to FIGS. 22 and 23, which shows the modular lightning protection system 100 when folded over, the handcart 170 may be used to cradle the mast assembly 130 when in a folded over state. The hinge assembly 120 facilitates the folded over state of the modular lightning protection system 100. Further, the handcart 170 may be used as a lift tool for installing the wheeled casters 140 beneath the base assembly 110 (see FIG. 21). More details of the handcart 170 are described herein below with reference to FIG. 19.

Referring again to FIG. 3, the base assembly 110 is formed, for example, by outer horizontal members 112, wherein the ends of the three outer horizontal members 112 may be connected one to the next to form a base structure. In one example, base assembly 110 is formed by three or more outer horizontal members 112, wherein the ends of the outer horizontal members 112 may be connected one to the next to form a triangular base structure. The base assembly 110 may further include inner horizontal members 114, e.g., three inner horizontal members 114. Namely, one end of each of the inner horizontal members 114 connects to one corner of the base structure and the other end of each of the inner horizontal members 114 connects to hinge assembly 120, which is at the center of the base structure. The base mast section 118 may also include radially projecting fins 119, for example, three radially projecting fins 119, for added structural integrity. A set of angled members 116, e.g., three angled members 116, connect the corners of the base structure (i.e., formed by the outer horizontal members 112), for example, to an upper portion of the fins 119. The outer horizontal members 112, the inner horizontal members 114, and the angled members 116 can be, for example, aluminum or aluminum alloy angle members, or any other suitable material.

All fasteners and installation hardware of the modular lightning protection system 100 may preferably be, for example, captive for fast installation and to avoid loose parts that could cause foreign object contamination and/or damage at sensitive sites. Preferably no tools are required for installation. For example, some of the base members that have hinge points may have double nut bolts and wave washers that do not require any attention by the operator during assembly. However, any other suitable mechanism may be used. Some or all of the mechanical attachment points may be accomplished, for example, by slots in one attaching piece and a captive cam lever fastener in the other piece. However, any other suitable quick connect/disconnect mechanism may be used. For example, FIG. 4 shows an example of a cam lever fastener 144 engaged with a slot 145. The modular lightning protection system 100 preferably includes several cam lever fasteners 144 and corresponding slots 145 so that the various components can be connected/disconnected, and thereby assembling/disassembling modular lightning protection system 100 with minimal, or preferably with no tools.

Figure 5:
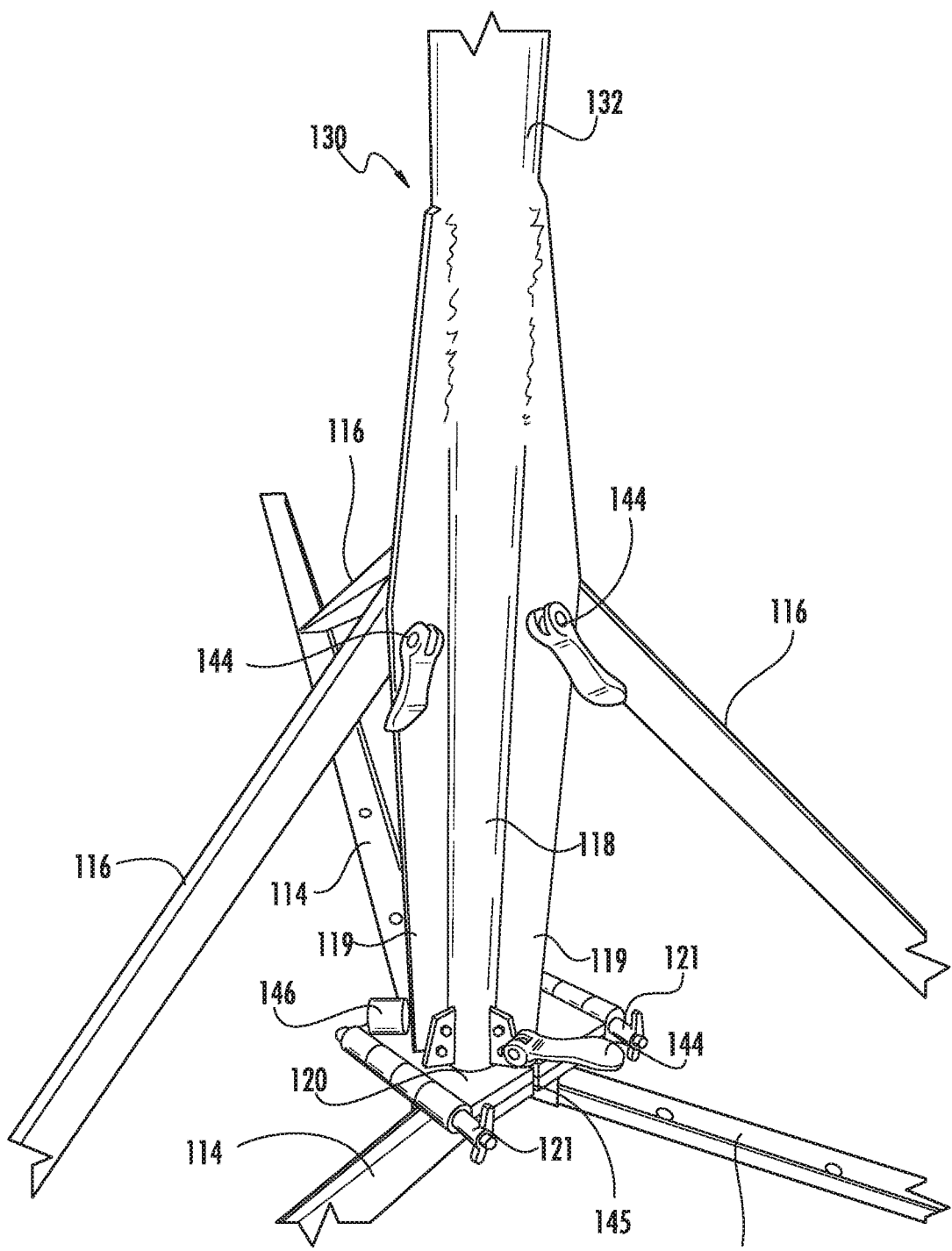
Figure 6:
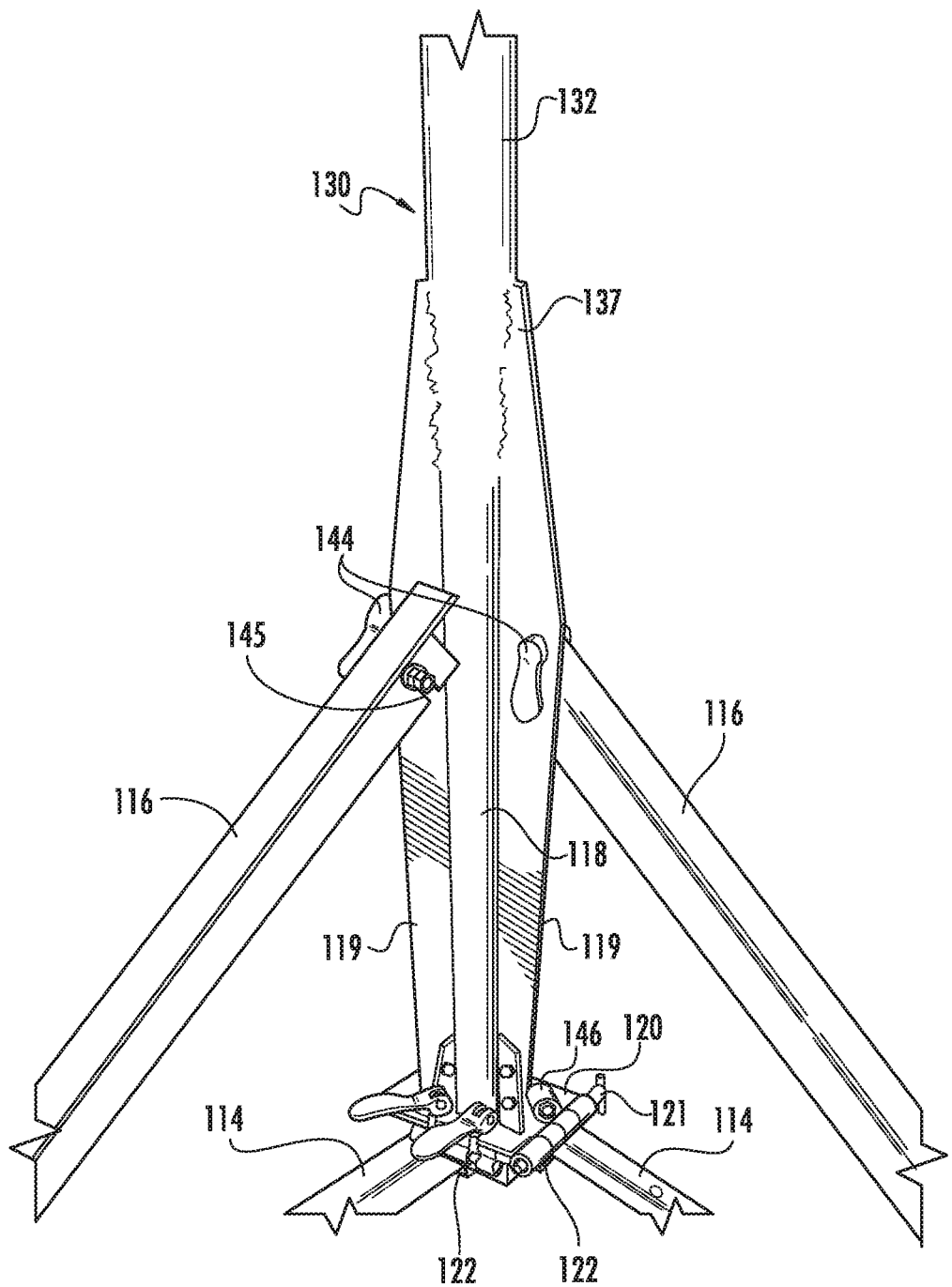
Figure 7:
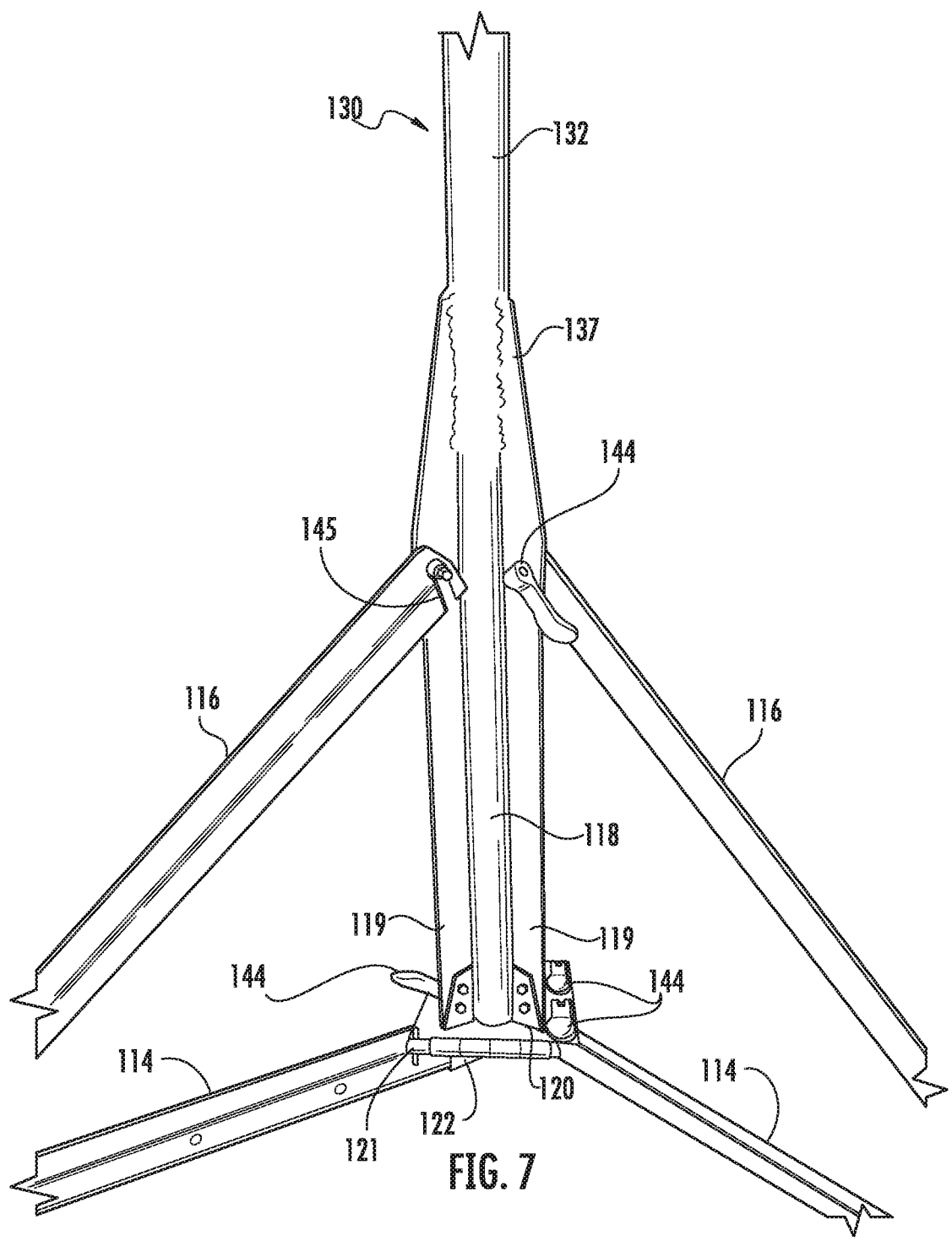

FIG. 5 through FIG. 9 illustrate more details of the base assembly 110 and the hinge assembly 120 of the modular lightning protection system 100 and showing several cam lever fasteners 144. In particular, FIG. 5, FIG. 6, and FIG. 7 show modular lightning protection system 100 in the deployed state wherein the hinge assembly 120 is closed and locked, for example by pins 121 (see FIG. 5). The pins 121 may, in one example, have detents released by a push button. However, any other suitable quick connect/disconnect type mechanism may be used.

Figure 8:
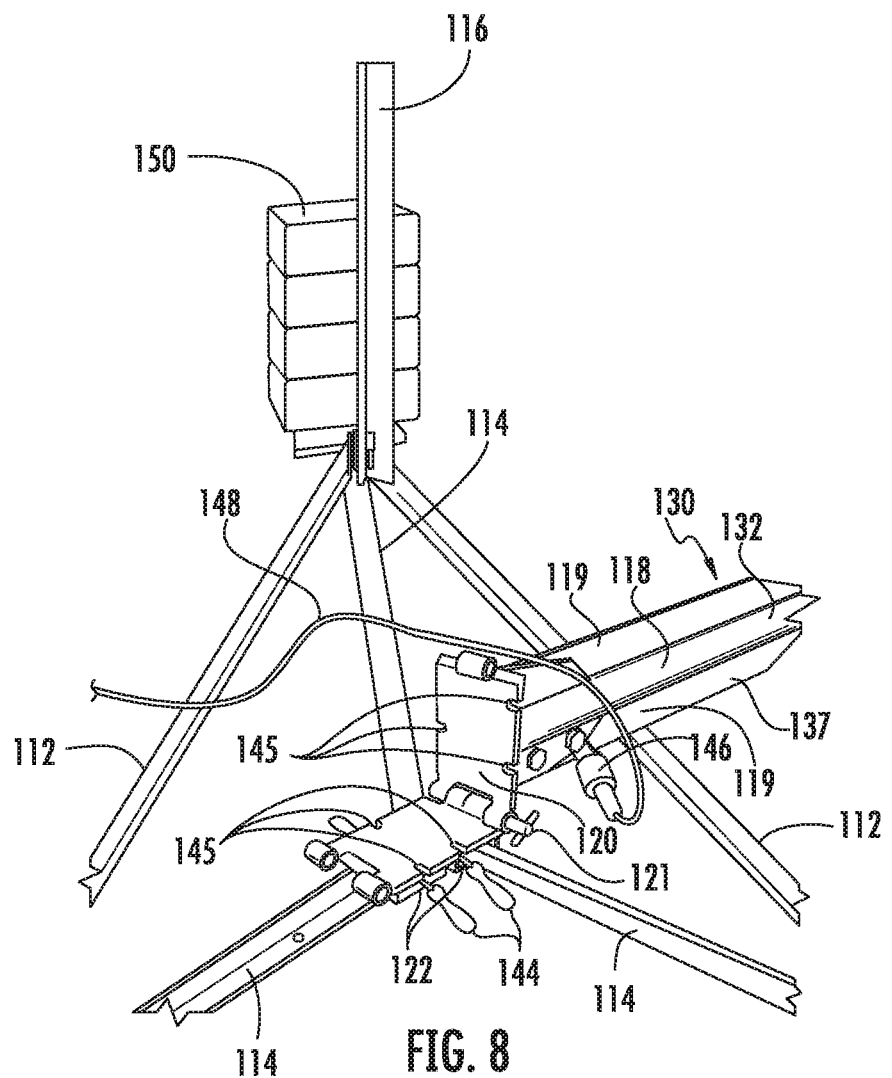
Figure 9:
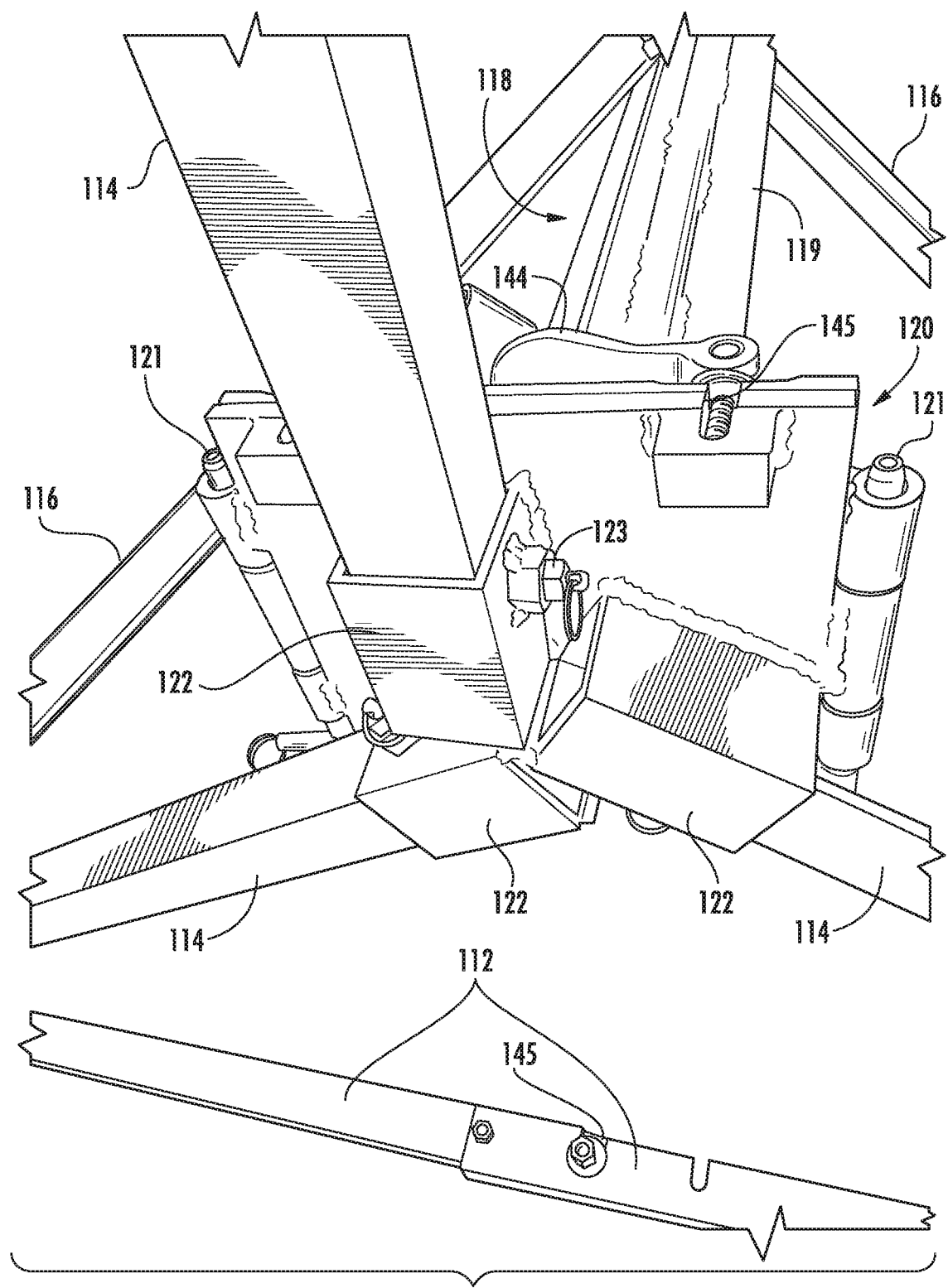

FIG. 8 shows the modular lightning protection system 100 in the folded over state wherein the hinge assembly 120 may be opened, for example, by removing one of the pins 121. FIG. 8 shows that the hinge assembly 120 may include a pair of hingeably connected plates with a hinge mechanism on two opposing sides. In one embodiment, one plate (e.g., the bottom plate) may be attached to the inner most ends of inner horizontal members 114 at a center portion of the base assembly 110. The other plate (e.g., the top plate) may be bolted, welded, or otherwise attached, to the base of the base mast section 118 and fins 119. When mated together, a hinge mechanism is provided on both sides of the plates, wherein each hinge mechanism may have a removable pin 121, thus allowing the mast assembly 130 to be folded in one of two directions. Referring to FIG. 9, in one embodiment, inner horizontal members 114 are preferably removably attached to the bottom plate of hinge assembly 120, by insertion of the inner most ends of inner horizontal members 114 into corresponding sleeves 122 and secured in place with preferably a quick connect/disconnect type mechanism, such as a pin 123, or any other suitable quick connect/disconnect type mechanism. The shape and size of the pair of hingeably connected plates of hinge assembly 120 provides, in addition to added structural integrity and stability, optimal electrical conducting properties. Cam lever fasteners 144, further operate to ensure a tight connection between the plates when the mast assembly 130 is in its upright position. Mast assembly 130 may, in one example, be detached from the hinge by removing both of pins 121, and removed from the base assembly 110 without the need to disassemble the entire base assembly 110.

Further, FIG. 5 and FIG. 8 show a coupler 146, for example, at the base of the base mast section 118. The coupler 146 is designed to receive, for example, a ground cable 148. The coupler 146 provides a mechanical and electrical connection of the ground cable 148 to the mast assembly 130. FIG. 10 shows the other end of the ground cable 148 connected to a ground rod 182 that may be driven into the ground. Ground cable 148 may be made of braided copper, for example 2/0-4/0, or other suitable material and gauge. The modular lightning protection system 100 can include one or multiple couplers 146, ground cables 148, and/or ground rods 182. However, in other embodiments, the modular lightning protection system 100 may be connected to an existing ground system, such as an existing ground system of an airfield.

Referring now to FIG. 11, FIG. 12, and FIG. 13 show more details of a corner portion of the base assembly 110 of the modular lightning protection system 100. Namely, one cam lever fastener 144, or other suitable device, may be used to couple together the ends of two outer horizontal members 112 and one inner horizontal member 114 as shown. FIG. 10, FIG. 11, and FIG. 12 also show that the base assembly 110 may optionally include a pair of rods or tubing 154 at each corner thereof. Each pair of rods or tubing 154 may be provided to engage with corresponding sleeves or grooves formed in water-ballast "brick" 150, thereby holding the water-ballast "brick" 150 in place atop the respective corner of the base assembly 110.

Referring now to FIG. 14, illustrates stay lines 138 of the modular lightning protection system 100 prior to deploying. The stay lines 138 may attach to a collar 136 at an upper portion of the mast assembly 130, e.g., about two-thirds up the mast assembly 130. In one example, stay lines 138 may be stainless steel vinyl coated ⅛" diameter wire, or any other suitable material/size. FIG. 15 and FIG. 16 show more details of installing the stay lines 138 of the modular lightning protection system 100. In one example, the stay lines 138 may pre-set at a fixed length making the attachment and tensioning of the stay lines 138 quick and easy. In one example, there are three stay lines 138, one of each attaching to collar 136 at one end and to a corner of base assembly 110 at its other end. One or more of the stay lines 138 may have a tensioning mechanism, such as a cam-over binder (e.g., a cam-over binder 156), that allows for easy tensioning of the stay lines 138. The stay lines 138 may also include turnbuckles 157 that may be adjusted and/or set prior to assembly if the tension of one or more of the stay lines 138 needs to be adjusted.

Referring now to FIG. 17 and FIG. 18, illustrates an example of a wheeled caster 140. Further, FIG. 19 shows a side view and front view of an example of the handcart 170. The handcart 170 may include a main bar 172, a handle 174 at a top end of the main bar 172, a set of wheels 176 at a bottom end of the main bar 172, a lift bar 178 also at the bottom end of the main bar 172, and a cradle bar 180 at an upper portion of the main bar 172. Handcart 170 is preferably multifunctional and may be used, for example, as a lift tool for installing the wheeled casters 140 beneath the base assembly 110 as shown, for example, in FIG. 20 and FIG. 21; to facilitate moving the modular lightning protection system 100, while in its deployed state, to a desired location; and to cradle the mast assembly 130 in the folded over position, as shown, for example, in FIG. 3, FIG. 22, and FIG. 23.

Referring now to FIG. 24, illustrates the carry cases of the modular lightning protection system 100. The carry case 160, in one example, may be a roll-away hard sided case that is used for stowing the components of the modular lightning protection system 100 when disassembled. FIG. 25 shows an example of the inside of the carry case 160. In one example, the dimensions of the carry case 160 are about 85.5 inches (about 2172 mm) long by about 20 inches (about 508 mm) wide by about 18 inches (about 458 mm) high and with a weight of about 270 pounds (about 123 kg) when loaded.

Referring again to FIG. 24, the carry case 152, in one example, may be a soft sided case for holding the water-ballast "bricks" 150, preferably when empty. In one example, the dimensions of the soft carry case 152 may be about 38 inches (about 965 mm) long by about 18 inches (about 458 mm) wide by about 18 inches (about 458 mm) high and with a weight of about 25 pounds (about 11.4 kg) when holding three empty water-ballast "bricks" 150.

Referring now to FIG. 26 is an example of a plot 2500 of a zone of protection of the modular lightning protection system 100 when fully deployed. The modular lightning protection system 100 protects a conical zone around it that is calculated by the "rolling ball method." This method is described in National Electrical Code (NEC), or NFPA70 published by the National Fire Protection Association (NFPA) (the contents of which are incorporated herein by reference), as well as the protection radii required for different types of assets. Briefly stated, assets are considered protected when they do not project into the surface of an imaginary sphere of suitable radius when it contacts both the top of the modular lightning protection system 100 and ground. A frequently used sphere has a radius of about 150 feet (about 45.7 m). The plot 2500 indicates an example conical zone of protection for the modular lightning protection system 100 having a height of about 38 ft.

FIG. 27 illustrates a flow diagram of an example of a method 2600 of deploying the modular lightning protection system 100. By deploying the modular lightning protection system 100 according to the method 2600, lighting strikes that may threaten assets and personnel under its cone of protection can be deterred and terminated. The method 2600 may include, but is not limited to, the following steps. Further, the method 2600 is not limited to the order of the following steps.

At a step 2610, the modular lightning protection system 100 is provided. For example, the modular lightning protection system 100 is provided in its disassembled state within the carry case 160. Additionally, and if needed, a set of empty water-ballast "bricks" 150 may be provided within the carry case 152.

At a step 2612, the components of the modular lightning protection system 100 are removed from the carry case 160.

At a step 2614, the base assembly 110 is assembled (preferably without requiring the use of tools). For example, assembly of the base mast section 118, the outer horizontal members 112, the inner horizontal members 114, and the angled members 116 do not require the use of any tools. In one example, mechanical attachment points may be accomplished by slots in one attaching piece and a captive cam lever fastener 144 in the other piece, and/or through the use of pins, carabineer clips, and/or other similar type of quick connect/disconnect devices.

At a step 2616, the mast assembly 130 is assembled (preferably without requiring the use of tools). For example, the mast sections 132 of the mast assembly 130 are coupled end-to-end via, for example, threaded couplers. Further, the air terminal 134 is installed in the end of the uppermost mast section 132.

At a step 2618, the mast assembly 130 is hingeably coupled to the base assembly 110 with the mast assembly 130 in the folded over position, as shown for example in FIG. 2 and FIG. 8. In the folded over position, in one example, one of the pins 121 is installed and the other pin 121 is not installed.

At a step 2620, as needed, the modular lightning protection system 100 may be positioned to a desired position. In one example, using the handcart 170, wheeled casters 140 may be installed beneath each corner of the base assembly 110, as shown for example in FIG. 18, FIG. 20, and FIG. 21. Handcart 170 may then be used to help move the modular lightning protection system 100. Once at the desired position, the wheeled casters 140 may be removed from beneath the corners of the base assembly 110 using the handcart 170 if needed. The modular lightning protection system 100 may be positioned while still in the folded over position, or alternatively while the mast assembly 130 is in its upright position.

At a step 2622, the modular lightning protection system 100 is grounded. In one example, one or more ground rods 182 may be driven into the ground. Then the one or more ground rods 182 are electrically connected to one or more couplers 146 of the modular lightning protection system 100 via one or more ground cables 148. In another example, the modular lightning protection system 100 can be connected to an existing ground system, such as the existing ground system of an airfield.

At a step 2624, the modular lightning protection system 100 is secured at the site. In one example, water-ballast "bricks" 150 may be positioned atop each corner of base assembly 110 as shown, for example, in FIG. 3 and FIG. 21. Water bricks 150 may be optionally held in place atop their respective corners of base assembly 110 by rods or tubing 154. Each corner of base assembly 110 may include one or more (e.g., 3-4), water bricks 150 placed thereon. Water bricks 150 may be filled prior to placement atop their respective corners of base assembly 110, or alternatively they may be filled after placement. In another example, instead of using water bricks 150, other weighted item(s) may be used, such as sand bags, blocks, weights, and the like. In another example, instead of using weights, ground spikes may be used to secure the base assembly 110 to the ground.

At a step 2626, using the hinge assembly 120 and the pins 121, the mast assembly 130 is placed and locked in the upright position, as shown for example in FIG. 1, FIG. 5, FIG. 6, and FIG. 7. Additionally, the stay lines 138 are attached and tensioned, as shown for example in FIG. 1, FIG. 15, and FIG. 16.

In summary and referring again to FIG. 1 through FIG. 27, the presently disclosed modular lightning protection system 100 comprises a modular mobile platform. The modular lightning protection system 100 may be a stand-alone, fully integrated, lightning protection system in, for example, kit form for rapid assembly and deployment as well as for longer term applications for a wide spectrum of special protection needs. The modular lightning protection system 100 is designed for quick installation as a reusable, modular mobile platform for easy assembly and movement in the desired operational area. The modular lightning protection system 100 preferably includes a lightweight, rugged aluminum alloy mast assembly 130, a mobility-enabled base assembly 110, customer-specified grounding attachment components (e.g., ground cables 148 and ground rods 182), and an air terminal 134. The mast sections 132 of the mast assembly 130 are modular and preferably of a length to facilitate easy stowing in a carry case (e.g., carry case 160). The modular lightning protection system 100, may be provided as a kit, wherein all the components may be stored and/or transported in carry case 160, and water-ballast "bricks" 150 may be stored and/or transported in case 152.

Further, in the modular lightning protection system 100, the base assembly 110 may include water-ballast "bricks" 150 for ballast. A carry case 152 may also be provided for transport of the water bricks. In addition to general field use, the base assembly 110 may be suitable for non-penetrating application, such as, rooftops, non-penetrable surfaces, and other critical surfaces.

The modular lightning protection system 100 is preferably capable of withstanding wind loads equivalent to about 120 mph (about 193 kph). Further, all components of the modular lightning protection system 100 are preferably corrosion resistant and suitable for indefinite deployment periods in sea coast or other challenging environments.

The function of the modular lightning protection system 100 is to provide a highly conductive, easily deployed structure to deter and terminate lighting strikes that may threaten assets and personnel under its cone of protection. The modular lightning protection system 100 may include streamer discharge dissipation technology to reduce the probability of lightning strikes, and serves as an air terminal for lightning strike termination when required. An example of one specific use of the modular lightning protection system 100 is a military airfield where there are a number of multi-million dollar aircraft sitting on an open tarmac and out in the open and susceptible to lightning strikes. However, the presently disclosed modular lightning protection system 100 can be used in any number of civilian or military applications.

In another embodiment, the invention provides a catenary lightning protection system including at least two lightning protection systems connected by a catenary wire and method of deploying same. In this embodiment, the lightning protection systems are connected by a catenary wire and have a combined lightning protection zone that is larger than the combined lightning protection zones of two lightning protection systems absent the catenary wire. Accordingly, the presence of the catenary wire connecting the two lightning protection masts serves to provide a substantially continuous and expanded lightning protection zone as compared with the two separate lightning protection zones of two lightning protection systems absent the catenary wire.

Referring now to FIG. 28 is a side view of a catenary lightning protection system 1000 comprising at least two lightning protection systems 1100A, 1100B connected by a catenary wire 1300. Catenary wire 1300 may be a aluminum conductor steel-reinforced (ACSR) cable, or other suitable cable, and may be about ¼" diameter in size. Further, FIGS. 29-31 show additional embodiments of the catenary lightning protection system 1000. Catenary lightning protection system 1000 includes at least two lightning protection systems, such as lightning protection systems 1100A, 1100B. Each of the lightning protection systems 1100A, 1100B includes, for example, a base assembly 1120 that supports a mast 1140. An air terminal 1160, e.g., UL-listed air terminal, is atop the mast 1140. In one example, the lightning protection systems 1100A, 1100B are designed for quick assembly and installation as well as easy movement within the desired operational area. The mast 1140 of the lightning protection systems 1100A, 1100B can be, for example, a lightweight, rugged aluminum alloy mast that is grounded via customer-specified grounding attachment components (not shown). The height of the lightning protection systems 1100A, 1100B can range, for example, from about 10 feet to about 40 feet, or other suitable height.

Additionally, the mast 1140 (and/or the air terminal 1160) may be alodined, anodized, painted, and/or coated with any other protective coating that presents no impediment to the voltage of a lightning flash. Alodining (chemical conversion) is a coating method intended to provide corrosion prevention to aluminum products left unpainted, as well as to improve adhesion of painting processes. Anodizing is the electrochemical oxidation of an aluminum surface designed to produce a stable film of the aluminum's oxide on that surface.

In one embodiment, the lightning protection systems 1100A, 1100B include the lightning protection system described in U.S. Pat. No. 9,083,172, entitled "Portable lightning protection system," issued on Jul. 14, 2015; the entire disclosure of which is incorporated herein by reference (as shown, for example, in FIGS. 28 and 29). That is, in this embodiment, lightning protection systems 1100A and 1100B may be the same as lightning protection system of the '172 patent, wherein at least two of the lightning protection systems of the '172 patent are connected by catenary wire 1300 to create the catenary lightning protection system 1000. The '172 patent describes a lightning protection system for placement adjacent structures requiring lightning protection. The lightning protection system of the '172 patent, in one embodiment, may include a multi-section conductive mast including a base mast section, and a top mast section; an air terminal attachable to the top mast section; a base attachable to the base mast section; and at least one grounding cable to ground the mast, wherein the base includes a plurality of radially extending horizontal beams having inner ends attachable to the base mast section and a plurality of inclined beams having inner ends attachable to the base mast section and outer ends attachable to the horizontal beams. The lightning protection system of the '172 patent, in another embodiment, may include a base mast section with an upper end and a plurality of radially extending, axially aligned ribs; a top mast section; preferably at least one intermediate mast section attachable to the upper end of the base mast section and to the lower end of the top mast section, the mast sections being axially aligned when attached; an air terminal having a conductive rod insertable into the bore of the top mast section; a base including a plurality of radially extending horizontal beams having inner ends attachable to the base mast section ribs and a plurality of inclined beams having inner ends attachable to the base mast section ribs and outer ends attachable to the horizontal beams; and grounding cables connecting the mast to the ground. The lightning protection system of the '172 patent, in yet another embodiment, may include a base mast section, which includes a plurality of radially projecting fins; one or more intermediate mast sections; and a top mast section. The intermediate mast sections may include threaded coupling near their lower ends to be screwed onto the tops of sections which attach to them. The lightning protection system of the '172 patent may also include an air terminal, wherein the air terminal may include a conductive rod that is inserted into a bore in the upper end of the upper mast section, and may also include a brush which may include a plurality of fine conductive wires. The lightning protection system of the '172 patent may also include ground wires that connect the system base to one or more ground rods. A carry bag may also be provided for convenient storage and transport of the components.

In another embodiment, the lightning protection systems 1100A, 1100B include the modular lightning protection system 100 described above, that is, lightning protection systems 1100A and 1100B may be the same as modular lightning protection system 100, wherein at least two of modular lightning protection systems 100 are connected by catenary wire 1300 to create the catenary lightning protection system 1000 (as shown, for example, in FIG. 30). The modular lightning protection system 100 includes a mobile platform. The modular lightning protection system 100 includes a modular base assembly and a mast assembly, wherein the mast assembly, when installed on the base assembly, can be in a folded over position or in an upright position. The modular lightning protection system 100 may further include wheeled casters for imparting mobility to the modular lightning protection system 100 as well as water-ballast "bricks" for weighting down the modular lightning protection system 100. In such an example, at least two of the modular lighting protection systems 100 are connected by catenary wire 1300.

In yet another embodiment, the lightning protection systems 1100A, 1100B may include a combination of the modular lightning protection system 100 and the lightning protection system of the '172 patent, that is, lightning protection systems 1100A and 1100B may include one of each of the modular lightning protection system 100 and the lightning protection system of the '172 patent, wherein the two are connected by the catenary wire 1300 to create the catenary lightning protection system 1000 (as shown, for example, in FIG. 31).

In the catenary lightning protection system 1000, the lightning protection systems 1100A and 1100B are electrically connected via a catenary wire 1300. At each of the lightning protection systems 1100A, 1100B, the catenary wire 1300 may ride on a pulley 1320 that is attached to an upper portion of the mast 1140. Each end of the catenary wire 1300 may be anchored to the ground (or surface) via, for example, ground spikes or stakes 1340. In particular, the catenary wire 1300 is pulled tight and then anchored to the ground (or surface).

Referring now to FIG. 32, illustrates an upper portion of the catenary lightning protection system 1000 and showing more details of the catenary wire 1300. FIG. 32 shows that the catenary lightning protection system 1000 preferably also includes a cable 1360 at each of the lightning protection systems 1100A, 1100B. Cable 1360 may be a aluminum conductor steel-reinforced (ACSR) cable, or other suitable cable/material, and may be about ¼" diameter in size. In one embodiment, at each of the lightning protection systems 1100A, 1100B, one end of the cable 1360 connects to the catenary wire 1300, for example near the pulley 1320, via a suitable clamp or other device and/or technique to provide a good electrical connection. The other end of the cable 1360 preferably connects to the mast 1140 a certain distance below the pulley 1320, for example, about 4 ft. below pulley 1320. The cable 1360 connects to the mast 1140 preferably via a clamp 1380, or other suitable mechanism. The purpose of the cable 1360 is to ensure a good electrical connection between the catenary wire 1300 that is riding on the pulley 1320 and the mast 1140.

Referring now to FIG. 33A, is schematic diagram of the catenary lightning protection system 1000 showing, an exemplary protection zone thereof. With the catenary wire 1300 present, the catenary lightning protection system 1000 provides a substantially continuous lightning protection zone 4000 between the two lightning protection systems 1100A, 1100B. By contrast, FIG. 33B is schematic diagram of the lightning protection systems 1100A, 1100B absent the catenary wire 1300 connecting them. Without the catenary wire 1300, the lightning protection system 1100A has a certain lightning protection zone 4000A and the lightning protection system 1100B has a certain lightning protection zone 4000B. In this example, the lightning protection zones 4000A, 4000B do not overlap. Accordingly, FIG. 33A illustrates the benefit of the catenary wire 1300, which is to expand the combined lightning protection zone 4000 between the two lightning protection systems 1100A, 1100B, as compared with the two separate lightning protection zones 4000A, 4000B shown in FIG. 33B. Additional pairs of lightning protection systems like 1100A, 1100B connected by catenary wire 1300 may be positioned in proximity to lightning protection systems 1100A, 1100B (e.g., parallel with) to expand the lightning protection zone 4000.

Referring now to FIG. 34, is a flow diagram of an example of a method 5000 of deploying the catenary lightning protection system 1000. By deploying the catenary lightning protection system 1000 according to the method 5000, lighting strikes that may threaten assets and personnel under its zone of protection can be deterred and terminated. The method 5000 may include, but is not limited to, the following steps. Further, the method 5000 is not limited to the order of the following steps.

At a step 5100, at least two lightning protection systems 1100, e.g., 1100A, 1100B are provided. In one example, lightning protection systems 1100A, 1100B include two lightning protection systems 100 as described above with reference to FIGS. 1-27. In another example, the two lightning protection systems 1100A, 1100B include the lightning protection system according to the '172 patent. In yet another example, lightning protection systems 1100A, 1100B include one lightning protection system 100 and one lightning mast protection system according to the '172 patent.

At a step 5120, the lightning protection systems 1100A, 1100B are setup. The lightning protection systems 1100A, 1100B are set up a certain distance apart at the location to be protected. For example, if the lightning protection systems 1100A, 1100B are about 38 feet in height, then they are set up about 80 feet apart, to provide an optimum lightning protection zone.

At a step 5140, the catenary wire 1300 is installed between the two lightning protection systems 1100A, 1100B. For example, the pulley 1320 and the cable 1360 are installed on the mast 1140 of the lightning protection system 1100A. Then, the pulley 1320 and the cable 1360 are installed at the top of the mast 1140 of the lightning protection system 1100B. Then, the catenary wire 1300 is installed upon the respective pulleys 1320 of the two masts 1140. Further, the two respective cables 1360 are each connected to the catenary wire 1300 and their respective masts 1140 via a suitable clamp or other device and/or technique to provide good electrical connections thereto. Then, the catenary wire 1300 is pulled tight and anchored to the ground (or surface) via, for example, the ground spikes or stakes 1340. For example, the catenary wire 1300 is pulled to about 20 lbs. of tension and anchored to the ground (or surface).

In summary and referring again to FIG. 28 through FIG. 34, in the catenary lightning protection system 1000, the two lightning protection systems 1100A, 1100B that are connected by the catenary wire 1300 have a combined lightning protection zone that is larger than the combined lightning protection zones of two lightning protection systems absent the catenary wire 1300. Accordingly, the presence of the catenary wire 1300 connecting the two lightning protection systems 1100A, 1100B serves to provide a substantially continuous and expanded lightning protection zone as compared with the two separate lightning protection zones of two lightning protection systems 1100A, 1100B absent the catenary wire 1300.

Further, at the site to be protected, the catenary lightning protection system 1000 can include multiple pairs of lightning protection systems 1100A, 1100B connected via catenary wire 1300.

The function of the catenary lightning protection system 1000, similar to that of the lightning protection system 100, is to provide a highly conductive, easily deployed lightning protection system to deter and terminate lighting strikes that may threaten assets and personnel under its zone of protection. A non-limiting example of one specific use of the catenary lightning protection system 1000 is protecting a military metal building(s) used for fuel storage which may be out in the open and susceptible to lightning strikes. However, the catenary lightning protection system 1000 can be used in any number of civilian and/or military applications.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A lightning protection system, comprising:
   a. a multi-section conductive mast assembly comprising at least a base mast section and a top mast section;
   b. an air terminal attachable to the top mast section;
   c. a base assembly attachable to the base mast section via a hinge assembly, wherein the hinge assembly is configured to allow the base mast section to hinge relative to the base assembly; and
      wherein the base assembly comprises a plurality of radially extending inner horizontal beams having inner ends attachable to the hinge assembly and a plurality of inclined beams having inner ends attachable to the base mast section and outer ends attachable to the radially extending horizontal beams, and wherein the base mast section further comprises a plurality of radially extending, axially aligned ribs, wherein a top horizontal plate of the hinge assembly comprises an upper surface and attachment plates extending upward from the top horizontal plate upper surface for attachment to the base mast section ribs.

2. The system of claim 1 wherein the base assembly further comprises a plurality of outer horizontal beams attachable between outer ends of the radially extending inner horizontal beams.

3. The system of claim 2 wherein the inner ends of the plurality of radially extending inner horizontal beams are attachable to the hinge assembly via insertion into corresponding sleeves thereon and are secured in place via a quick connect/disconnect mechanism, and wherein the inner ends of the plurality of inclined beams are attachable to the base mast section and the outer horizontal beams are attachable to outer ends of the radially extending inner horizontal beams, via quick connect/disconnect mechanisms.

4. The system of claim 3 wherein the quick connect/disconnect mechanism for securing the inner ends of the plurality of radially extending horizontal beams within the corresponding sleeves of the hinge assembly comprises a removable pin, and wherein the quick connect/disconnect mechanisms for attaching the inner ends of the plurality of inclined beams to the base mast section and for attaching the outer horizontal beams to outer ends of the radially extending inner horizontal beams comprises cam lever fasteners.

5. The system of claim 1 further comprising at least one grounding cable to ground the multi-section conductive mast assembly.

6. The system of claim 5 further comprising at least one ground rod to ground the at least one grounding cable to earth.

7. The system of claim 1 wherein the hinge assembly comprises a top horizontal plate and a bottom horizontal plate hingedly connected on at least one side thereof.

8. The system of claim 7 wherein the top horizontal plate and bottom horizontal plate are hingedly connected on two opposing sides thereof.

9. The system of claim 7 wherein the top horizontal plate and bottom horizontal plate are secured together in a non-hinged state via one or more cam lever fasteners, wherein one of the top horizontal plate and bottom horizontal plate comprises one or more captive cam lever fastener and the other of the top horizontal plate and bottom horizontal plate comprises one or more corresponding slots for the one or more captive cam lever fasteners to engage.

10. The system of claim 1 wherein the inner ends of the plurality of inclined beams are attachable to the base mast section ribs.

11. The system of claim 1 further including at least one intermediate mast section disposed between the base mast section and the top mast section.

12. The system of claim 1 wherein sections of the multi-section conductive mast are joined by a threaded coupling.

13. A method of deploying a lightning protection system, the method comprising:
   a. providing a lightning protections system, comprising:
      i. a multi-section conductive mast assembly comprising at least a base mast section and a top mast section;
      ii. an air terminal attachable to the top mast section;
      iii. a base assembly attachable to the base mast section via a hinge assembly, wherein the hinge assembly is configured to allow the base mast section to hinge relative to the base assembly; and
         wherein the base assembly comprises a plurality of radially extending inner horizontal beams having inner ends attachable to the hinge assembly and a plurality of inclined beams having inner ends attachable to the base mast section and outer ends attachable to the radially extending horizontal beams, and wherein the base mast section further comprises a plurality of radially extending, axially aligned ribs, wherein a top horizontal plate of the hinge assembly comprises an upper surface and attachment plates extending upward from the top horizontal plate upper surface for attachment to the base mast section ribs;
   b. assembling the base assembly;
   c. assembling the multi-section conductive mast assembly;
   d. connecting the base mast section to the base assembly via the hinge assembly;
   e. positioning the base assembly to a desired location and securing in position;
   f. grounding the lightning protection system; and
   g. placing and securing the multi-section conductive mast assembly in an upright position using the hinge assembly.

14. A catenary lightning protection system, comprising:
   a. at least two lightning protection systems, each lightning protection system comprising:
      i. a multi-section conductive mast assembly comprising at least a base mast section and a top mast section;
      ii. an air terminal attachable to the top mast section;
      iii. a base assembly attachable to the base mast section, wherein the base assembly of at least one of the at least two lightning protection systems are attachable to the base mast section via a hinge assembly, wherein the hinge assembly is configured to allow the base mast section to hinge relative to the base assembly; and
         wherein the base assembly attachable to the base mast section via a hinge assembly comprises a plurality of radially extending inner horizontal beams having inner ends attachable to the hinge assembly and a plurality of inclined beams having inner ends attachable to the base mast section and outer ends attachable to the radially extending horizontal beams, and wherein the base mast section of the base assembly attachable to the base mast section via a hinge assembly further comprises a plurality of radially extending, axially aligned ribs, wherein a top horizontal plate of the hinge assembly comprises an upper surface and attachment plates extending upward from the top horizontal plate upper surface for attachment to the base mast section ribs; and b. a catenary wire connected between the at least two lightning protection systems.

15. A method of deploying a catenary lightning protection system, the method comprising:

a. providing at least two lightning protection systems, each lightning protection system comprising:
   i. a multi-section conductive mast assembly comprising at least a base mast section and a top mast section;
   ii. an air terminal attachable to the top mast section;
   iii. a base assembly attachable to the base mast section;
   iv. a catenary wire connected between the at least two lightning protection systems, wherein the base assembly of at least one of the at least two lightning protection systems are attachable to the base mast section via a hinge assembly, wherein the hinge assembly is configured to allow the base mast section to hinge relative to the base assembly; and
      wherein the base assembly attachable to the base mast section via a hinge assembly comprises a plurality of radially extending inner horizontal beams having inner ends attachable to the hinge assembly and a plurality of inclined beams having inner ends attachable to the base mast section and outer ends attachable to the radially extending horizontal beams, and wherein the base mast section of the base assembly attachable to the base mast section via a hinge assembly further comprises a plurality of radially extending, axially aligned ribs, wherein a top horizontal plate of the hinge assembly comprises an upper surface and attachment plates extending upward from the top horizontal plate upper surface for attachment to the base mast section ribs;

b. assembling the at least two lightning protection systems;

c. positioning the at least two lightning protection systems a certain distance apart and securing in position;

d. grounding the at least two lightning protection systems; and e. installing a catenary wire between the at least two lightning protection systems.

\* \* \* \* \*